(12) United States Patent
Piper

(10) Patent No.: US 12,097,796 B2
(45) Date of Patent: Sep. 24, 2024

(54) EXPANDABLE CAMPER TRAILER

(71) Applicant: Danny A. Piper, Peru, IN (US)

(72) Inventor: Danny A. Piper, Peru, IN (US)

( * ) Notice: Subject to any disclaimer, the term of this patent is extended or adjusted under 35 U.S.C. 154(b) by 369 days.

(21) Appl. No.: 17/663,528

(22) Filed: May 16, 2022

(65) Prior Publication Data
US 2022/0371504 A1 Nov. 24, 2022

Related U.S. Application Data

(60) Provisional application No. 63/201,907, filed on May 18, 2021.

(51) Int. Cl.
*B60P 3/34* (2006.01)

(52) U.S. Cl.
CPC ...................... *B60P 3/34* (2013.01)

(58) Field of Classification Search
CPC ...... B60P 3/34; B60P 3/36; B60P 3/38; B60P 3/32
See application file for complete search history.

(56) References Cited

U.S. PATENT DOCUMENTS

| | | | |
|---|---|---|---|
| 2,380,867 A * | 7/1945 | Packer | F16C 23/00 384/255 |
| 2,790,673 A * | 4/1957 | Zur Nieden | B60P 3/34 296/171 |
| 3,200,545 A * | 8/1965 | Bunge | B60P 3/34 D12/104 |
| 3,362,745 A * | 1/1968 | Flajole | B60P 3/34 296/26.02 |
| 3,399,920 A * | 9/1968 | Knowlton | B60P 3/34 52/72 |
| 3,697,121 A | 10/1972 | Park | |
| 3,941,414 A * | 3/1976 | Platt | B60P 3/34 296/26.02 |
| 4,165,117 A | 8/1979 | Kaiser | |
| 7,017,975 B2 | 3/2006 | Parmer | |
| 7,810,866 B2 | 10/2010 | Dempsey et al. | |
| 8,528,963 B1 | 9/2013 | Brawley | |
| 9,333,820 B2 | 10/2016 | Anabtawi et al. | |
| 10,183,608 B2 | 1/2019 | Knight | |
| 11,554,709 B2 * | 1/2023 | McGregor | E04B 1/34352 |

(Continued)

FOREIGN PATENT DOCUMENTS

| | | | | |
|---|---|---|---|---|
| CN | 112693386 A | * | 4/2021 | B60P 3/34 |
| KR | 20190060209 A | * | 6/2019 | |

*Primary Examiner* — Lori Lyjak
(74) *Attorney, Agent, or Firm* — Woodard, Emhardt, Henry, Reeves & Wagner, LLP

(57) ABSTRACT

An expandable camper trailer includes a frame, a body structure supported by the frame, and a roof structure covering the body structure. The body structure includes a left sidewall assembly and a right sidewall assembly that are each formed from panels. The panels are hinged so that the panels may pivot or rotate to convert the camper trailer between a folded configuration and an expanded configuration. In the folded configuration, outer rear panels and outer front panels are parallel to and overlay adjacent base rear panels and base front panels. In the expanded configuration, the outer rear and outer front panels are hinged outward to a position substantially perpendicular to the corresponding base rear and base front panels, while middle panels may be hinged downward to increase the size of the camper trailer.

20 Claims, 23 Drawing Sheets

(56) References Cited

U.S. PATENT DOCUMENTS

| | | | |
|---|---|---|---|
| 2015/0246699 A1* | 9/2015 | Anabtawi | B60P 3/34 280/504 |
| 2017/0240088 A1 | 8/2017 | Tait | |
| 2019/0225134 A1* | 7/2019 | Gault | B60P 3/34 |

* cited by examiner

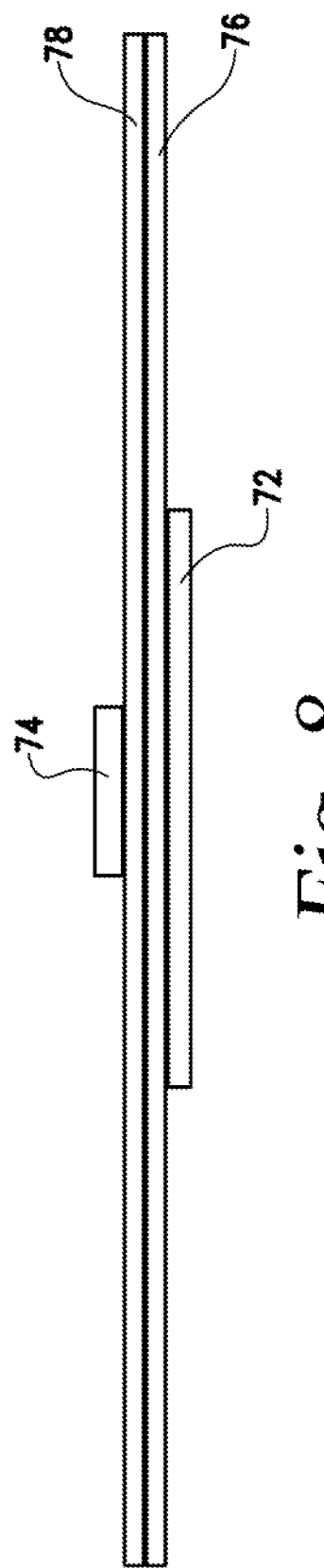

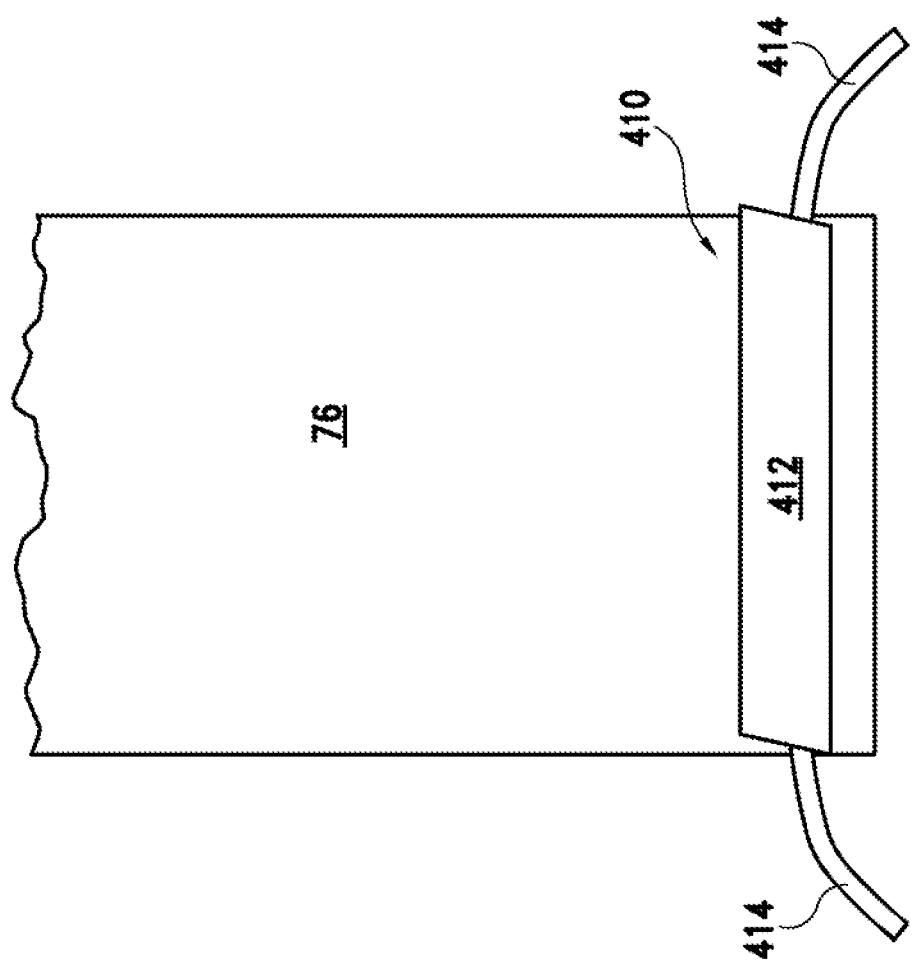

EXPANDABLE CAMPER TRAILER

BACKGROUND

The present disclosure pertains generally to the field of camper trailers, in particular aspects, to camper trailers that are expandable.

Camper trailers are a form of recreational vehicle that are towable or that may be motorized on their own. Camper trailers can be a form of temporary accommodation for people going camping or going on a trip or vacation. At times, it may be desired to have a larger trailer to increase living space and comfort for when the camper trailer is being used for housing. However, increasing the size of the trailer can make the trailer heavier, and therefore less efficient and unwieldy to tow when it is desired for the camper trailer to be moved. Camper trailers may be foldable to reduce the size of the camper trailer when moving, but as the camper trailer folds in upon itself, the storage space within the camper trailer during towing is decreased.

Therefore, there is a need for improvement in this field.

SUMMARY

In certain embodiments, an expandable camper trailer includes a frame that provides support for a body structure and a roof structure that covers the body structure. The frame includes a base frame and a midframe extending from the base frame. The body structure includes a floor supported by the base frame and a left sidewall assembly and a right sidewall assembly. Each of the sidewall assemblies include panels that are attached to the midframe. In some examples, the midframe may include a top edge and a total of four midframe side edges. The panels of the sidewall assemblies may be arranged in a folded configuration or in an expanded configuration.

In the embodiment shown, each sidewall may include a total of five panels. A middle panel is hinged at the floor of the body structure so that the middle panel may pivot with respect to the floor. In the folded configuration, the middle panel is arranged to be substantially perpendicular with respect to the floor. In the expanded configuration, the middle panel is rotated downward about the floor so that the middle panel is substantially parallel to the floor.

The sidewall assembly also includes a base front panel and an outer front panel that each extend forward from the midframe. For example, the base front panel for each sidewall may be attached to a different side edge of the midframe. The base front panel is attached to the midframe, and the outer front panel is hinged to the base front panel so that the outer front panel may pivot with respect to the base front panel. In the folded configuration, the outer front panel is arranged to be substantially parallel to the base front panel so that the outer front panel overlays the base front panel. In the expanded configuration, the outer front panel is hinged about the base front panel so that the outer front panel is substantially perpendicular to the base front panel.

Each sidewall assembly also includes a base rear panel and an outer rear panel that each extend rearward from the midframe. For example, the base rear panel for each sidewall may be attached to a different side edge of the midframe. The base rear panel is attached to the midframe, and the outer rear panel is hinged to the base rear panel so that the outer rear panel may pivot or rotate with respect to the base rear panel. In the folded configuration, the outer rear panel is arranged to be substantially parallel to the base rear panel so that the outer rear panel overlays the base rear panel. In the expanded configuration, the outer rear panel is hinged about the base rear panel so that the outer rear panel is substantially perpendicular to the base rear panel.

In the expanded configuration, the camper trailer forms a shape similar to a plus sign. The additional space of the expanded configuration is defined by the hinged middle panels and outer front and rear panels. The expanded configuration is useful for additional living area and/or additional storage when the camper trailer is stationary. The camper trailer may be returned to the folded configuration when it is desired to move the camper trailer.

The roof structure of the camper trailer includes a mid-roof that is supported by the midframe. One or more roof panels are mounted to the mid-roof. In some embodiments, one or more of the roof panels are rotatable with respect to the mid-roof. When the camper trailer is in the expanded configuration, at least one of the roof panels may be rotated with respect to the mid-roof so that the rotated roof panel may cover the hinged middle panels and outer front and rear panels. In some instances, the roof panels may be made of different materials. For example, one roof panel may be made from an opaque material while the other roof panel may be made from a transparent, clear material to allow natural light to enter the interior space of the camper trailer.

In some examples, the roof structure may include a total of three or more roof panels mounted to the mid-roof. The third roof panel may be rotatable with respect to the first roof panel and with respect to the second roof panel. The third roof panel may be made from a mesh material to allow ventilation within the interior space defined by the body structure of the camper trailer.

In some embodiments, a roof support may be attachable between a roof panel and a support surface defined on the camper trailer or exterior to the camper trailer. The roof support may hold up the roof panel to provide a canopy type structure adjacent to the interior space of the camper trailer.

In some embodiments one or more brackets may extend along a width of a corresponding roof panels. The bracket projects outward from the corresponding roof panel and a tube is attached to and in fluid communication with the bracket. The bracket is designed to collect liquid, such as rainwater, that runs off of the first roof panel and then sends the liquid through the tube to a location exterior of the camper trailer. In some embodiments, rainwater is sent to a storage tank that is located either on the exterior of the camper trailer or within the interior of the camper trailer.

In some embodiments, the base frame may define a base volume below the body structure. The camper trailer may include a cabinet that is positioned within the base volume when the trailer is in the folded configuration. The cabinet is rotatable with respect to the body structure so that said cabinet is configured to be rotated to a position exterior of the base volume when the trailer is in the expanded configuration.

In some embodiments, the camper trailer may include one or more tables. Each table may be insertable between adjacent panels of the body structure when the expandable trailer is in the expanded configuration. In the folded configuration, the tables may be stored between an adjacent outer panel and base panel. Additionally, in some embodiments, the table may be hingeable with respect to the outer panel and the base panel.

Some embodiments may include a method of expanding a camper trailer. The method may include hinging a first middle panel about a floor so that the first middle panel is substantially parallel to the floor. A first outer rear panel is then rotated about a hinged connection to a first base rear panel so that the first outer rear panel is substantially perpendicular to the first base rear panel. A first outer front panel may be rotated about a hinged connection to a first base front panel so that the first outer front panel is substantially perpendicular to the first base front panel.

A second middle panel may be hinged about the floor so that the second middle panel is substantially parallel to the floor. A second outer rear panel may be rotated about a hinged connection to a second base rear panel so that the second outer rear panel is substantially perpendicular to the second base rear panel. A second outer front panel may be rotated about a hinged connection to a second base front panel so that the second outer front panel is substantially perpendicular to the second base front panel. A second roof panel mounted on a mid-roof attached to a midframe extending from the floor may be rotated with respect to a first roof panel attached to the mid-roof, so that the second roof panel is aligned with the first and second middle panels and covers the first and second outer rear panels and the first and second outer front panels.

In some embodiments, the first outer rear panel and the first outer front panel may both be rotated to a position adjacent to the first middle panel. The second outer rear panel and the second outer front panel may both be rotated to a position adjacent to the second middle panel.

Further forms, objects, features, aspects, benefits, advantages, and embodiments of the present invention will become apparent from a detailed description and drawings provided herewith.

BRIEF DESCRIPTION OF THE DRAWINGS

FIG. 8 is a side view of a roof structure of the camper trailer of FIG. 1.

FIG. 23 is a diagrammatic view of a rain catch that may be included on a roof panel of the camper trailer.

DESCRIPTION OF THE SELECTED EMBODIMENTS

Figure 1:
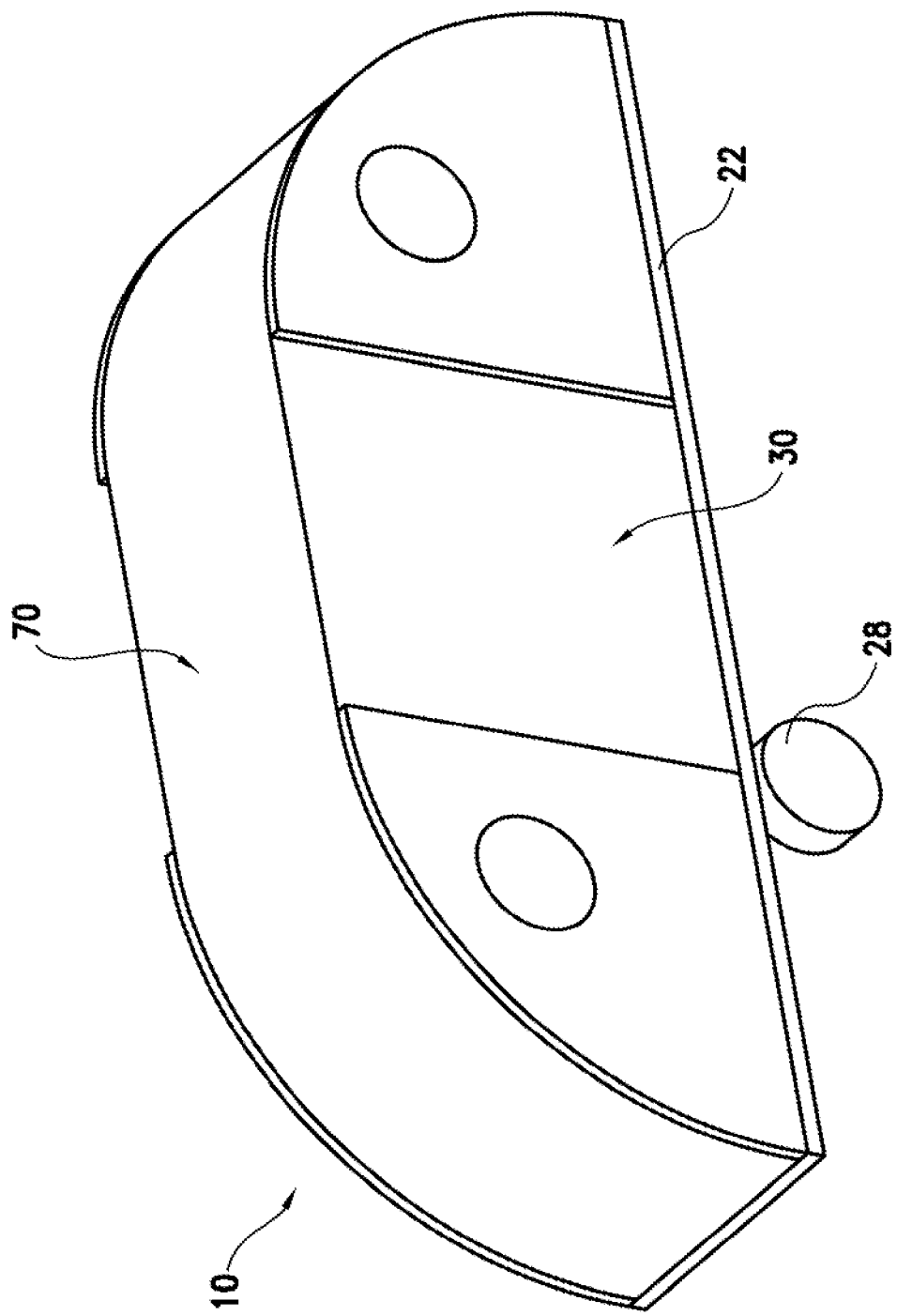
FIG. 1 is a side perspective view of an expandable camper trailer.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

A perspective view of an expandable camper trailer 10 in a folded configuration is shown in FIG. 1. The camper trailer includes a frame 20 (see FIG. 2) which provides support for a body structure 30 and a roof structure 70 covering the body structure 30. The camper trailer 10 includes a folded configuration that is suitable for traveling and that may also be utilized for storage while traveling. The camper trailer 10 also includes an expanded configuration (see FIG. 6, for example) that increases the space for habitation or for storage.

Figure 2:
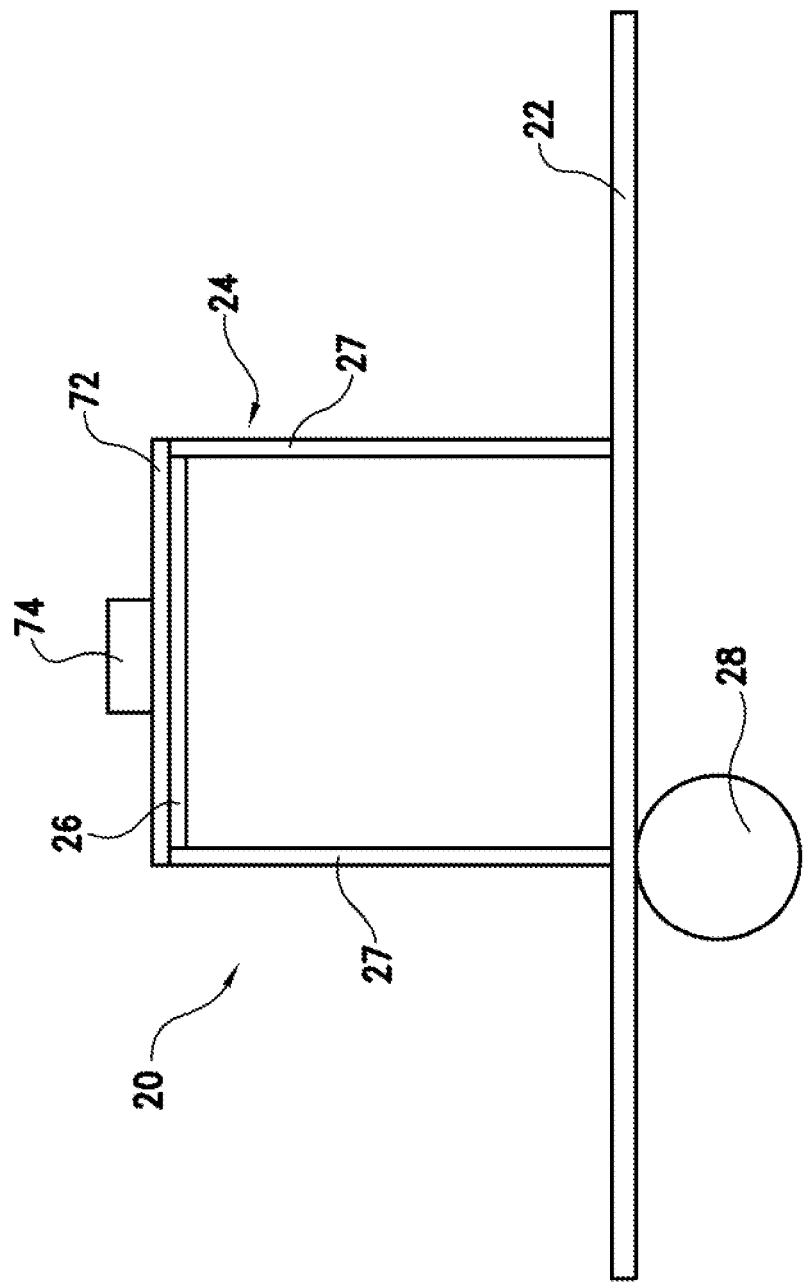
FIG. 2 is a side view of a frame of the camper trailer of FIG. 1.

A side view of an embodiment of the frame 20 is illustrated in FIG. 2. As shown, the camper trailer 10 includes a base frame 22 that acts as a base for the body structure 30 of the camper trailer 10. The base frame 22 may be made from steel or aluminum, or another suitable material. Two or more wheels 28 may be supported by the frame 20, for example, at the base frame 22, allowing the trailer to be towed by a vehicle such as a pick-up truck or any other suitable vehicle for towing. In some embodiments, the camper trailer 10 may include a hitch for attachment to the vehicle. In some examples, the hitch on the camper trailer 10 may be configured to fit on a ball mount on the towing vehicle. In other embodiments, the expandable camper trailer 10 may not include wheels 28, but operate instead as a stationary, expandable shelter.

A midframe 24 extends vertically from the base frame 22. The midframe 24 includes a top edge 26 and side edges 27. In the embodiment shown, the midframe 24 has a squared, box shape. However, in other embodiments, the midframe 24 may be rectangular or have another suitable shape. The midframe 24 may be made from steel, aluminum, or another suitable material that has sufficient strength for supporting panels of the camper trailer 10.

A stationary mid-roof 72 is positioned on top of the midframe 24. The mid-roof 72 includes a roof protrusion 74 that extends vertically from the mid-roof 72. The protrusion may be used to house a high velocity, in-out fan for powered ventilation to circulate air within the camper trailer 10. Additionally, as described in greater detail below, the base of the roof protrusion 74 may also serve as a pivot point to allow rotation of flexible roof panels of the roof structure 70.

Figure 3:
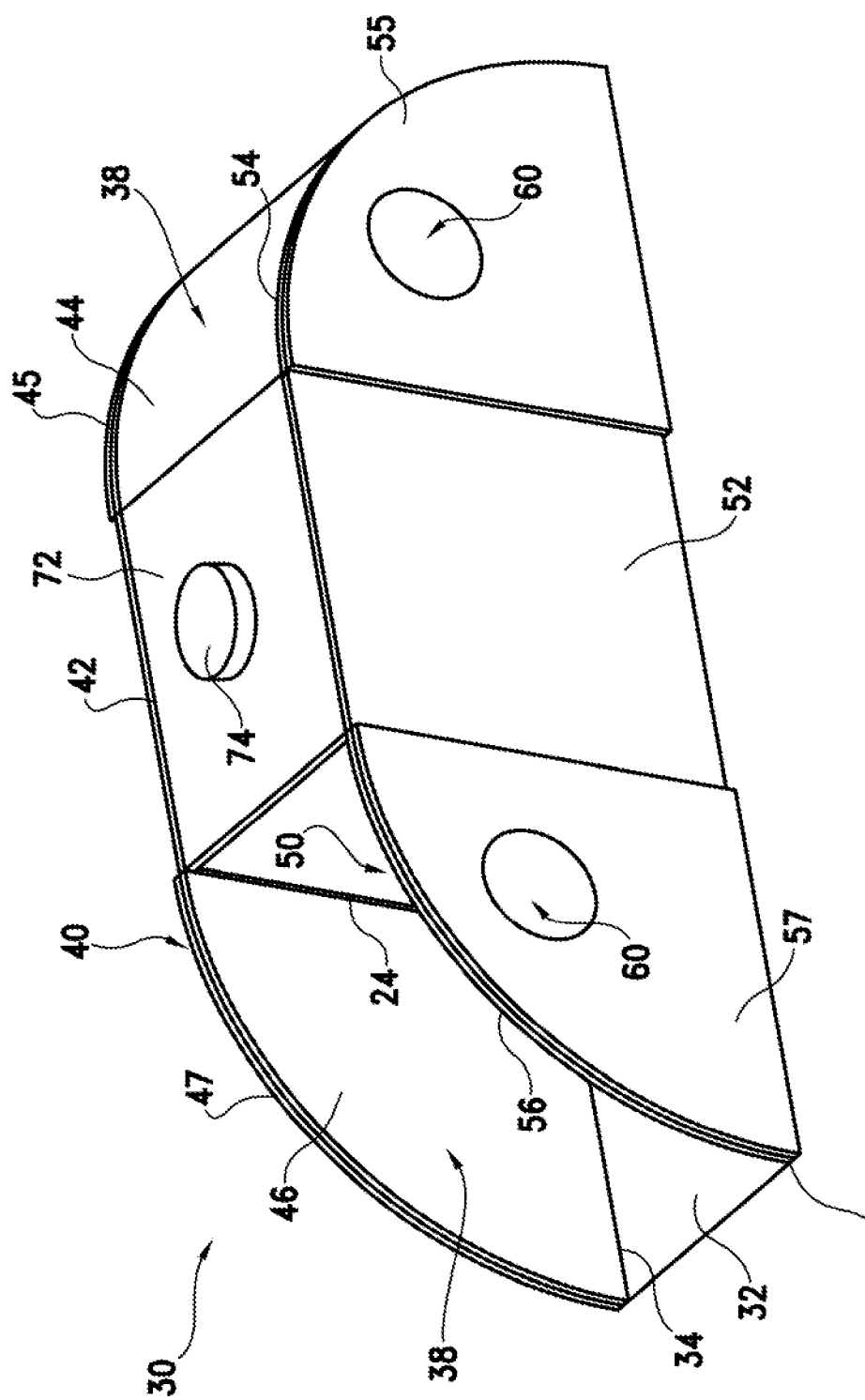
FIG. 3 is a perspective view of a body structure of the camper trailer of FIG. 1 in a folded configuration.

A perspective view of the body structure 30 of the camper trailer 10 in the folded configuration with the roof structure 70 removed is illustrated in FIG. 3. As shown, and as described in greater detail below, the body structure 30 is formed by panels attached to the midframe 24. Each of the panels may be rotated with respect to the midframe 24, allowing the camper trailer 10 to be arranged in a folded configuration or in an expanded configuration. The body structure includes a floor 32 that is supported by the base frame 22 and the floor 32 serves as a base for the body structure 30. In some embodiments, the floor 32 may be made of plywood or other wood material that is stained and varnished. In other embodiments, the floor 32 may be made from aluminum or another material that is capable of providing support for objects or people that may be present within the interior space of the camper trailer 10. In some embodiments, the floor 32 may be integral to or a part of the base frame 22.

Parallel sidewall assemblies 40, 50 extend vertically from opposing edges of the floor 32. Interior space 38 is defined between the sidewall assemblies 40, 50. The left sidewall assembly 40 extends vertically from a left edge 34 of the floor 32 and the right sidewall assembly 50 extends vertically from a right edge 36 of the floor 32.

The left sidewall assembly 40 includes a middle panel 42 positioned between a base front panel 44 and a base rear panel 46. The middle panel 42 may be hinged at the left edge 34 of the floor 32, allowing the middle panel 42 to rotate about the left edge 34. In the folded configuration, the middle panel 42 is substantially perpendicular to the floor 32. A latch may be used to secure the middle panel 42 to the mid-roof 72 supported by the midframe 24. However, in the expanded configuration the middle panel 42 may be unlatched from the mid-roof 72 and hinged into a position in which the middle panel 42 is substantially parallel to the floor 32.

The base front panel 44 and the base rear panel 46 are attached to and supported by the midframe 24. As shown in FIG. 3, an outer front panel 45 is hinged to the base front panel 44, so that the outer front panel 45 may be rotated at least 90 degrees with respect to the base front panel 44. The outer front panel 45 may be arranged substantially parallel to the base front panel 44 so that the outer front panel 45 is adjacent to and overlays the base front panel 44 when in the folded configuration. In the expanded configuration, the outer front panel 45 may be rotated to a position that is substantially perpendicular with respect to the base front panel 44. Similarly, an outer rear panel 47 is hinged to the base rear panel 46, so that the outer rear panel 47 may be rotated at least 90 degrees with respect to the base rear panel 46. The outer rear panel 47 may be arranged substantially parallel to the base rear panel 46 when in the folded configuration. In the expanded configuration, the outer rear panel 47 may be hinged to a position that is substantially perpendicular with respect to the base rear panel 46.

The right sidewall assembly 50 is arranged similarly to the left sidewall assembly 40. The right sidewall assembly includes a middle panel 52 that is positioned between a base front panel 54 and a base rear panel 56. The middle panel 52 may be hinged at the right edge 36 of the floor 32, allowing the middle panel 52 to rotate about the right edge 36. In the folded configuration, the middle panel 52 is substantially perpendicular to the floor 32. A latch may be used to secure the middle panel 52 to the mid-roof 72 supported by the midframe 24. However, in the expanded configuration the middle panel 52 may be unlatched from the mid-roof 72 and hinged into a position in which the middle panel 52 is substantially parallel to the floor 32.

The base front panel 54 and the base rear panel 56 are attached to and supported by the midframe 24. As shown in FIG. 3, an outer front panel 55 is hinged to base front panel 54, so that the outer front panel 55 may be rotated at least 90 degrees with respect to the base front panel 54. The outer front panel 55 may be arranged substantially parallel to the base front panel 54 when in the folded configuration. In the expanded configuration, the outer front panel 55 may be hinged to a position that is substantially perpendicular with respect to the base front panel 54. Similarly, an outer rear panel 57 is hinged to the base rear panel 56, so that the outer rear panel 57 may be pivoted or rotated at least 90 degrees with respect to the base rear panel 56. The outer rear panel 57 may be arranged substantially parallel to the base rear panel 56 when in the folded configuration. In the expanded configuration, the outer rear panel 57 may be hinged to a position that is substantially perpendicular with respect to the base rear panel 56.

Figure 4:
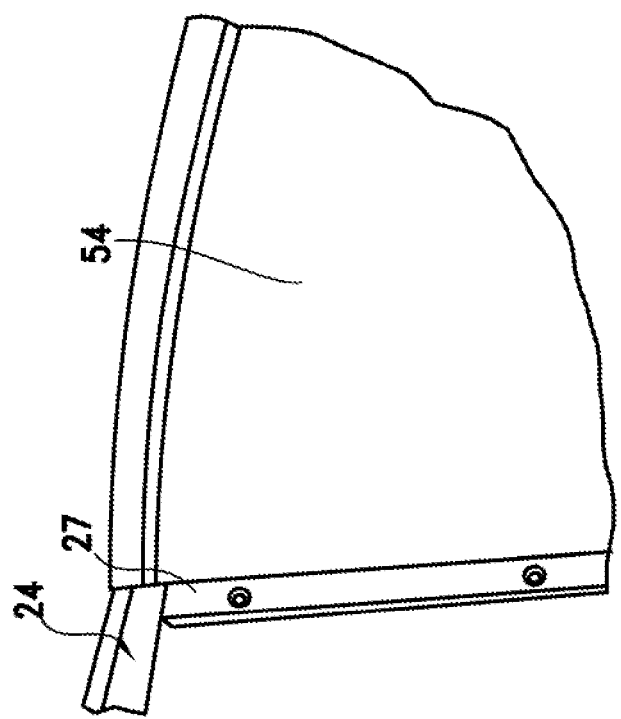
FIG. 4 is a view of a base panel attached to the midframe of the body structure of the camper trailer of FIG. 1.

An interior view of the connection between the midframe 24 and one of the base panels, for example, base front panel 54 is shown in FIG. 4. As shown, the base front panel 54 is mounted to the side edge 27 of the midframe 24 using bolts. Each of the base panels 44, 54, 46, 56 maybe mounted to a corresponding side edge 27 of the midframe 24 in this manner. In other embodiments, other suitable fasteners may be used to mount the base panels 44, 54, 46, 56 to the midframe 24.

Figure 5:
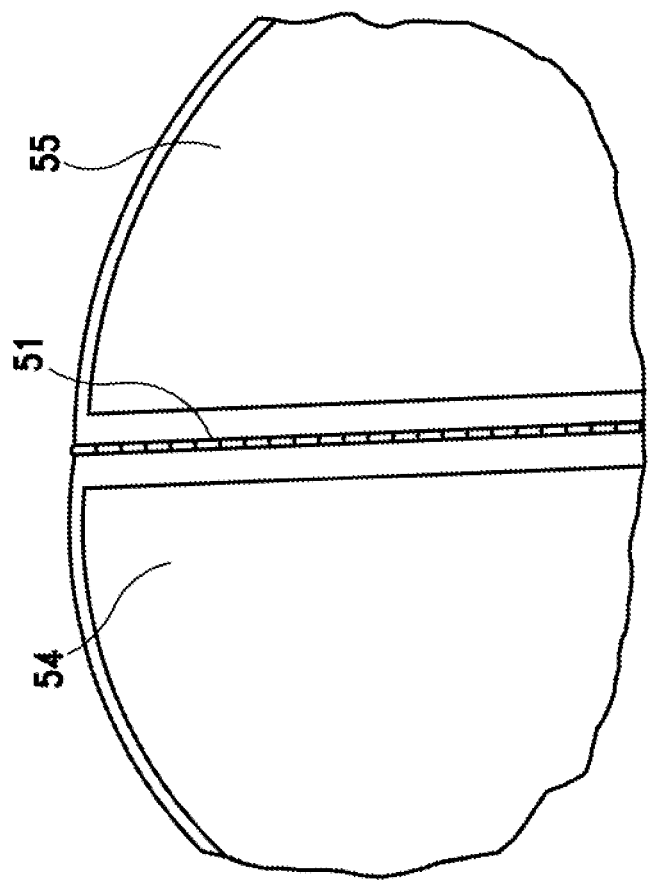
FIG. 5 is a view of a base panel attached to an outer panel of the body structure of the camper trailer of FIG. 1.

FIG. 5 illustrates an exterior view of the connection between a base panel, such as base front panel 54, and an outer panel, such as outer front panel 55. A hinge 51 is attached to the base front panel 54 and also attached to the outer front panel 55, allowing the outer front panel to hinge about the base front panel. Each of the outer panels 45, 47, 55, 57 may be attached to the corresponding base panel 44, 46, 54, 56 in a similar manner to allow the outer panel to hinge about the corresponding base panel. In other embodiments, different varieties of hinges may be used as desired to connect the outer panels to the base panels.

In the embodiment shown, each of the front panels 44, 45, 54, 55 and the rear panels 46, 47, 56, 57 is curved to form a quarter circle shape. The rounded shape of the panels can improve the aerodynamics and the efficiency of the camper trailer 10. Additionally, seals or gaskets may be present on the outer edges of the midframe 24 and may also be present on some of or a portion of the edges of the any of the front panels, middle panels and rear panels to help prevent water or moisture from entering into the interior space of the camper trailer 10. Further, seals or gaskets may also be present on the stationary mid-roof 72 to prevent water or moisture from entering into the interior space of the camper trailer 10.

In some embodiments, each of the front panels and rear panels may include a window 60 that is defined through the width of the panels and provides light to the interior space 38 of the camper trailer 10. In the embodiment shown in FIGS. 1 and 3, the window 60 is circular and positioned near the center of the panel. However, in other embodiments, the window 60 may be any desired shape, such as rectangular, square, or triangular. Additionally, the window 60 may be positioned in a different location on the panel, such as near the top of the panel. In some embodiments, the panels that include a window 60 may be modified as desired. For example, windows 60 may be present on the outer front panels 45, 55 and the outer rear panels 47, 57 while the front panels 44, 54 and rear panels 46, 56 do not include a window 60.

Figure 6:
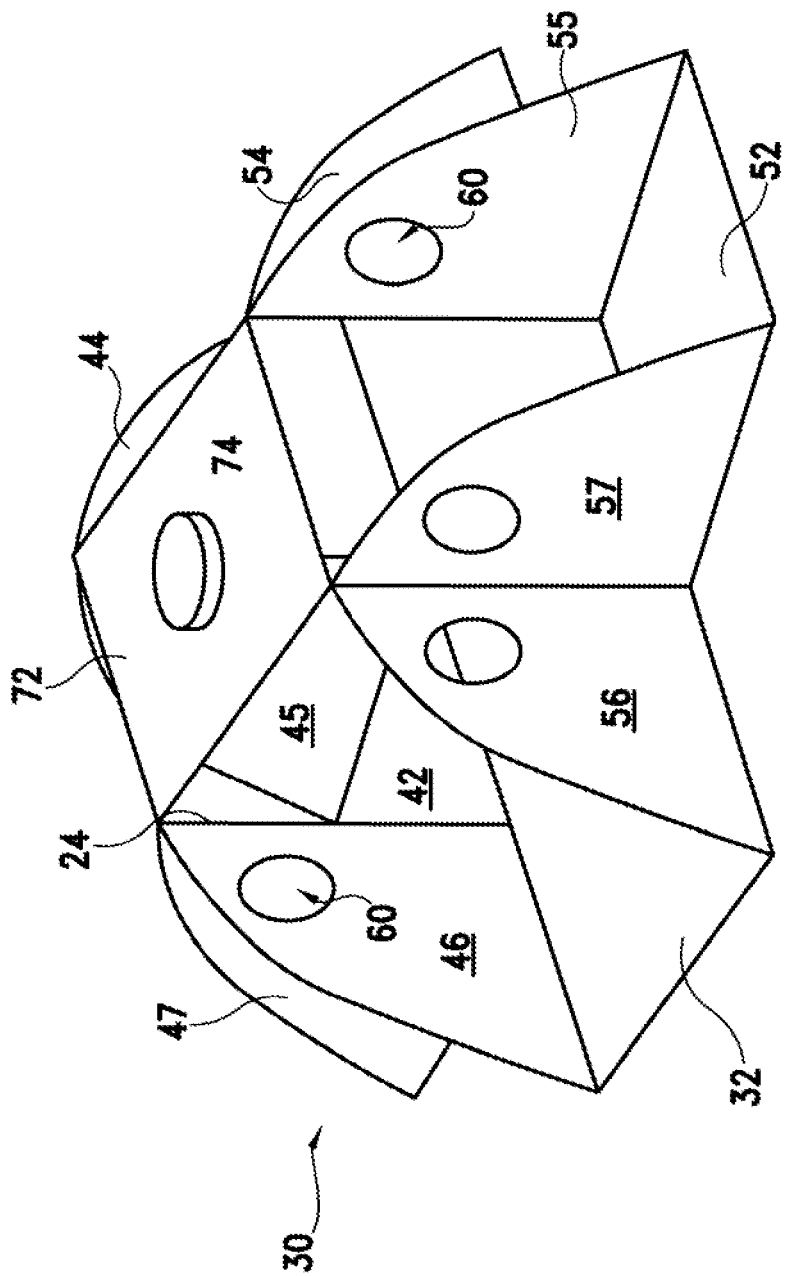
FIG. 6 is a perspective view of a body structure of the camper trailer of FIG. 1 in an expanded configuration.

A perspective view of the body structure 30 in the expanded configuration is shown in FIG. 6. As illustrated, the middle panels 42, 52 have been hinged downward about the floor 32 to form additional floor space for the camper trailer 10. Additionally, each of the outer panels 45, 47, 55, 57 have been hinged about the respective base panels 44, 46, 54, 56 to provide walls that surround the lowered middle panels 42, 52. This results in a structure that has a shape similar to a plus sign or a cross. In some embodiments, the panels are sized to form four equally sized, square rooms which all extend from a square-shaped center room.

Figure 7B:
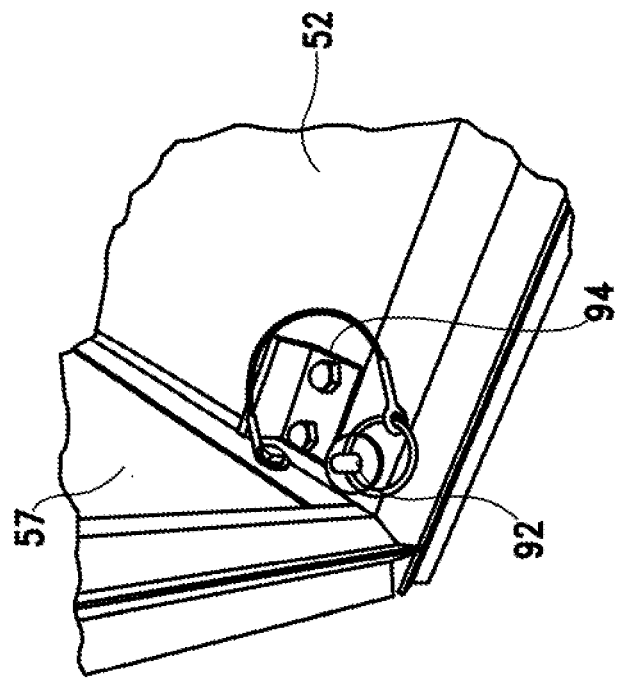
FIG. 7B is a view of the pin mechanism of FIG. 7A in a secured position for securing the outer panel to the middle panel.
Figure 7A:
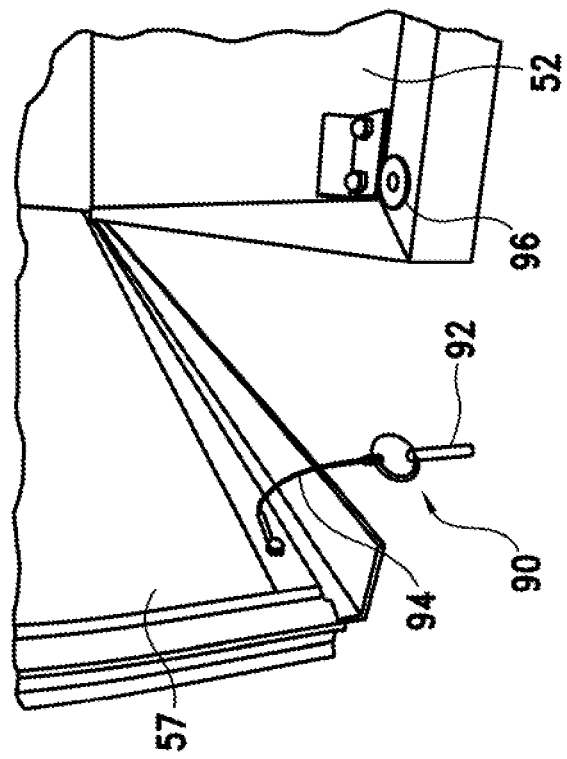
FIG. 7A is a view of a pin mechanism for securing an outer panel to a middle panel of the body structure of the camper trailer of FIG. 1.
Figure 7C:
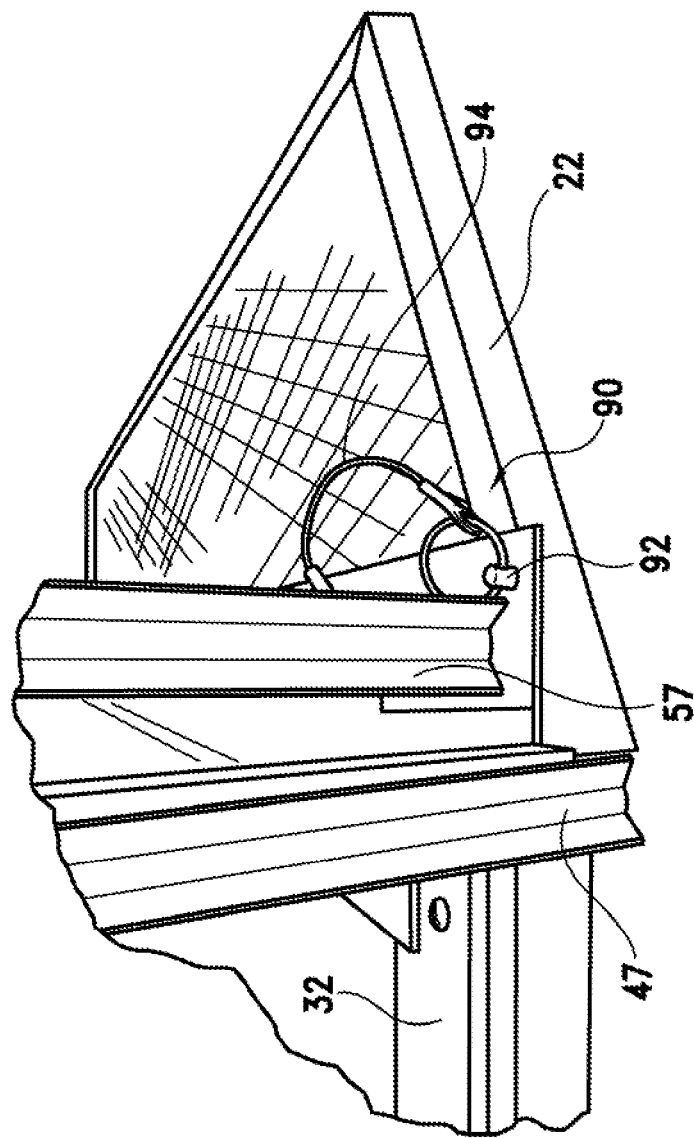
FIG. 7C is a view of the pin mechanism of FIG. 7A being used to secure the outer panel to the base frame.

As shown in FIGS. 7A-7C, in some embodiments, the outer panels 45, 47, 55, 57 may include a pin mechanism 90. This pin mechanism 90 may be used to secure the outer panels 45, 47, 55, 57 to the respective middle panel 42, 52 in the expanded configuration. The pin mechanism 90 may also be used to secure the outer panels 45, 47, 55, 57 to the base frame 22 when the camper trailer 10 is in the folded configuration.

FIGS. 7A-7B show the connection of outer rear panel 57 to middle panel 52 as a representative example, but the pin mechanism 90 can be used for any of the outer panels 45, 47, 55, 57. The pin mechanism 90 includes a pin 92 secured by a lanyard 94 to the inner surface of outer rear panel 57. The pin 92 is sized to fit within a pin recess 96 defined through the middle panel 52. When the outer rear panel 57 is arranged in the folded configuration or when the outer rear panel 57 is being hinged between the folded and expanded configuration, the pin 92 is allowed to hang from the lanyard 94 (see FIG. 7A). When the outer rear panel 57 is hinged to a position in which it is adjacent to the middle panel 52, the pin 92 may be inserted through the pin recess 96 in the middle panel 52 (see FIG. 7B) to secure the outer rear panel 57 to the middle panel 52. In other embodiments, other attachment mechanisms may be used to secure the outer panels 45, 47, 55, 57 to their respective middle panel 42, 52. For example, a latch, threaded fastener, or any other suitable attachment mechanism may be used.

FIG. 7C shows the pin mechanism 90 in use to secure the outer rear panel 57 to the base frame 22 when the outer rear panel 57 is arranged in the folded configuration. In the folded configuration, the pin 92 goes through an L-bracket mounted on the bottom of the outer rear panel 57 and the pin 92 is inserted into an extension of the base frame 22. The interaction between the pin mechanism 90 and the base frame 22 holds the outer rear panel 57 in a position adjacent to the base panel 56 when the outer rear panel 57 is arranged in the folded configuration. It should be recognized that this method of attachment using the pin mechanism 90 may be used for any of the outer panels 45, 47, 55, 57.

In some embodiments, the pin mechanism 90 may also be used to secure the outer panels 45, 47, 55, 57 to the base frame 22 at each corresponding corner of the base frame 22. The base frame 22 may include corresponding pin recesses 96 similar to the pin recess shown in the middle panel 52 illustrated in FIG. 7A. In the folded configuration, when each of the outer panels is oriented parallel to a corresponding base panel, the pin 92 from the outer panel may be inserted through the pin recess 96 of the base frame 22 to secure the outer panel to the base frame 22. In other embodiments, other suitable attachment mechanisms may be used rather than the pin mechanism.

The expanded configuration of the body structure 30 adds additional floor space that is equal to the size of the middle panels 42, 52, increasing the interior space 38 of the camper trailer 10. In the embodiment shown, the interior space of the camper trailer 10 is increased by approximately 67%. However, in some embodiments, the amount of expansion created by rearranging the body structure 30 in the expanded configuration rather than the folded configuration can be increased or decreased by altering the size of the middle panels 42, 52 as desired. As an example, to increase the area of the body structure 30 in the expanded configuration, the size of the middle panels 42, 52 may be increased.

A representative side view of the roof structure 70 is illustrated in FIG. 8. As shown, the roof structure 70 includes the mid-roof 72, which is supported by the top edge 26 of midframe 24 when attached to the body structure 30 (see FIG. 2). A roof protrusion 74 extends from the mid-roof 72. A pair of roof panels 76, 78 are mounted on the roof protrusion 74. One or both of the roof panels 76, 78 may be rotatably mounted on the roof protrusion 74. As an example, roof panel 76 may be stationary and unable to rotate and roof panel 78 may be rotatable. In another example, both roof panels 76, 78 may be rotatable.

In some embodiments, the roof protrusion 74 is not necessary and the rotatable roof panels 76, 78 are mounted to the mid-roof 72 in a different manner that allows rotation of one or both of the rotatable roof panels 76, 78 with respect to the mid-roof 72. As an example, a bolt and washer system may be used to allow the rotatable roof panels 76, 78 to rotate with respect to mid-roof 72.

In some embodiments, one of the rotatable roof panels, for example, roof panel 76, may be made from an opaque material, such as aluminum or stainless steel. The other rotatable roof panel, for example, roof panel 78, may be made from a clear, transparent material, such as polycarbonate to allow for passive solar heating and to allow for an exterior view of the surrounding environment from within the interior space 38 of the camper trailer 10 when the roof panel 78 is rotated to an orientation that is not parallel to roof panel 76. In other embodiments, the roof panels 76, 78 may be made from other suitable, desired material. As an example, one of the roof panels may be made from a screen material to allow ventilation within the interior space 38 of the camper trailer 10.

In some embodiments, the roof panels 76, 78 may have a width that is equal to the distance between adjacent base panels, for example the distance between the left base rear panel 46 and the right base rear panel 56. In other embodiments, the roof panels 76, 78 may have a greater width so that the roof panels 76, 78 cover the outer panels as well. In these embodiments, the roof panels 76, 78 have a width that is greater than or equal to the distance between the outer rear panels 47, 57 and greater than or equal to the distance between the outer front panels 45, 55.

Figure 9:
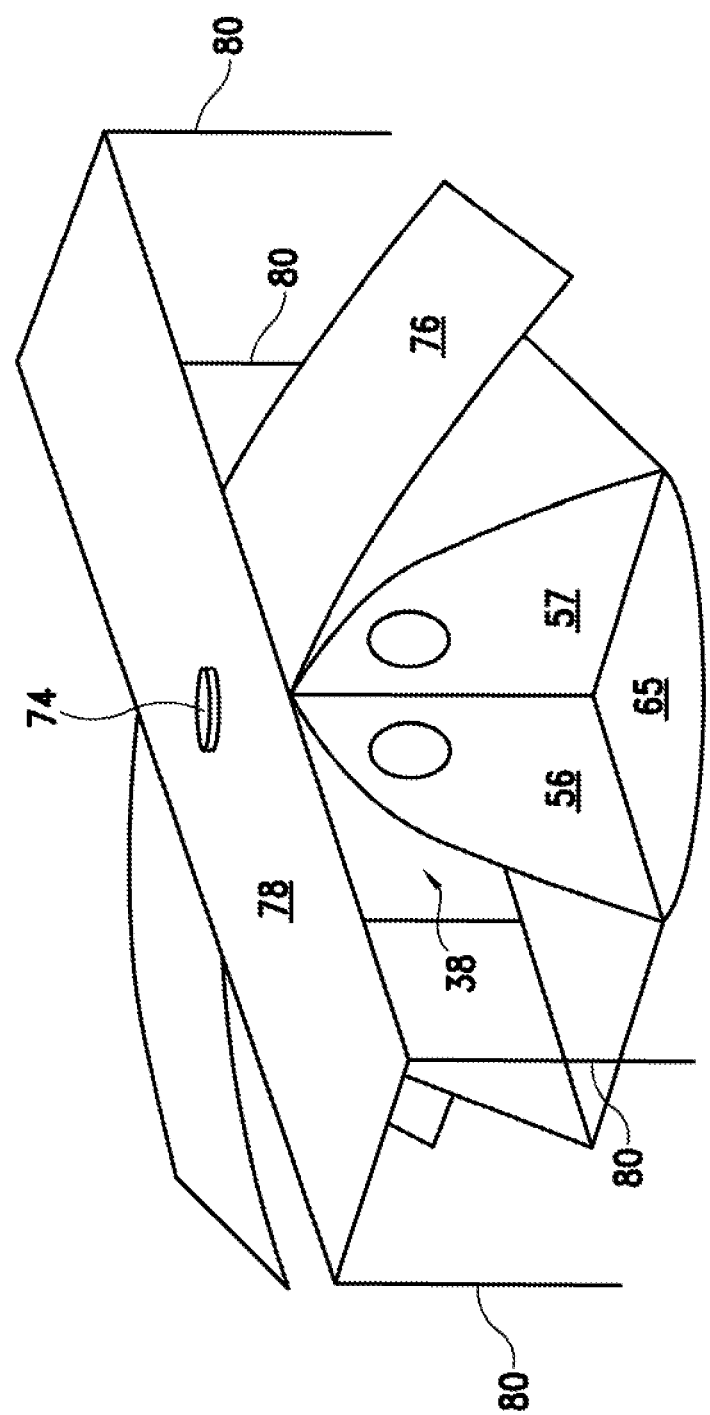
FIG. 9 is a perspective view of the camper trailer of FIG. 1 in the expanded configuration.

FIG. 9 illustrates the roof structure 70 in use when the camper trailer 10 is arranged in the expanded configuration. As shown, the rotatable roof panel 76 may be rotated approximately 90 degrees with respect to the outer roof panel 78 so that the rotatable roof panel 76 covers the expanded interior space 38 formed by hinging the outer panels 45, 47, 55, 57 outward.

Figure 10B:
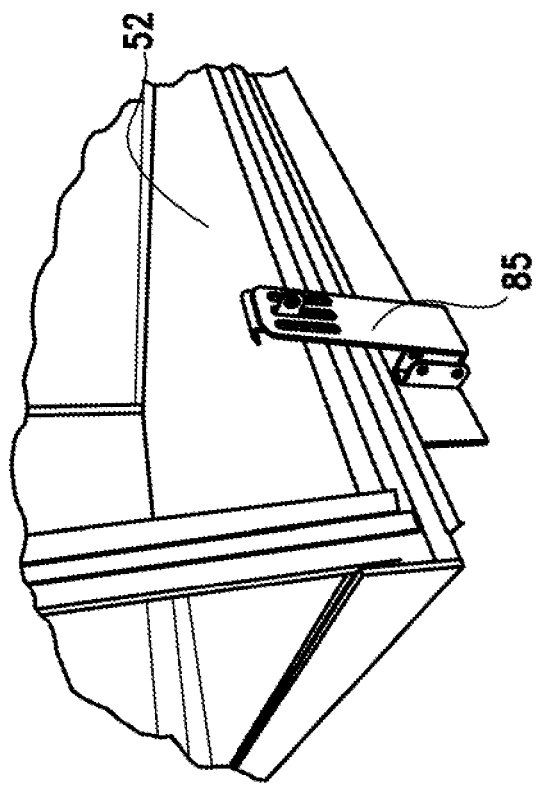
FIG. 10B is a latch mechanism for securing a roof panel to the middle panel when the camper trailer of FIG. 1 is in an expanded position.
Figure 10A:
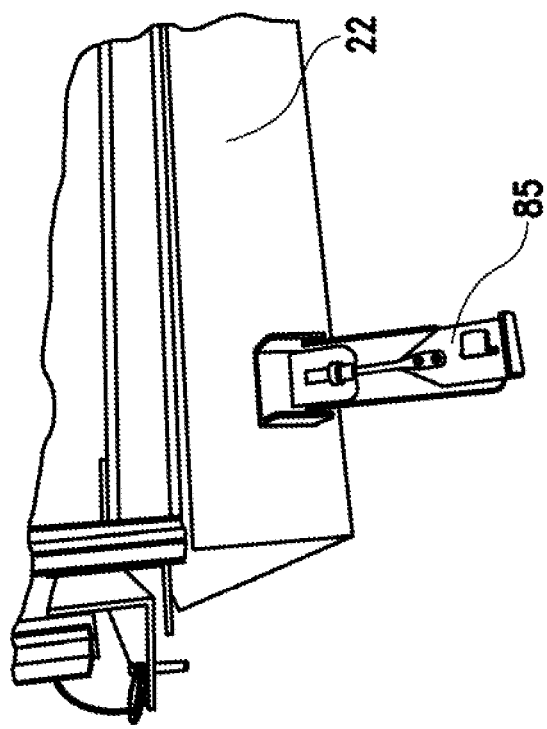
FIG. 10A is a latch mechanism for securing a roof panel to the base frame for the camper trailer of FIG. 1.

Typically, gravity causes the portions of the roof panels that extend past the mid-roof 72 to bend or over the body structure 30. The edges of the roof panels, for example, roof panel 76, may be secured to the base frame 22 or to one of the middle panels 42, 52 by a latch, fastener, or other suitable mechanism to secure the roof panel to the body panels. An example of a roof latch mechanism 85 attached to the base frame 22 is illustrated in FIG. 10A. In the expanded configuration, the hinged middle panel 42, 52 extends further than the base frame 22, so a roof latch mechanism 85 is provided on the middle panel 42, 52 (see FIG. 10B) for the roof panel 76, 78 that is rotated to the cover the expanded portion of the camper trailer 10 in the expanded configuration. In some embodiments, the latch mechanism 85 on the middle panel 42, 52 may be smaller than the latch mechanism 85 on the base frame 22.

The roof panels 76, 78 may be unattached from the latch mechanism 85 and open the interior space 38 of the camper trailer to the outside environment. If desired, roof supports 80 (see FIG. 9) may be used to support one or more of the roof panels 76, 78 to form a canopy over the body structure, creating an entrance into the interior space 38 of the camper trailer 10. In some embodiments, a mechanism may be provided that allows the height at which the roof panels 76, 78 are opened to be adjusted to allow the amount of ventilation within the camper trailer 10 to be adjusted.

The description of the roof panels 76, 78 above is just one representative embodiment of the combination of roof panels that may be included in the roof structure 70. In other embodiments, more or fewer roof panels may be included on the roof structure 70 as desired. In one example, a single roof panel 76 may be included in the roof structure 70, and the expanded portion of the camper trailer 10 remains uncovered when the camper trailer 10 is arranged in the expanded configuration.

Figure 11:
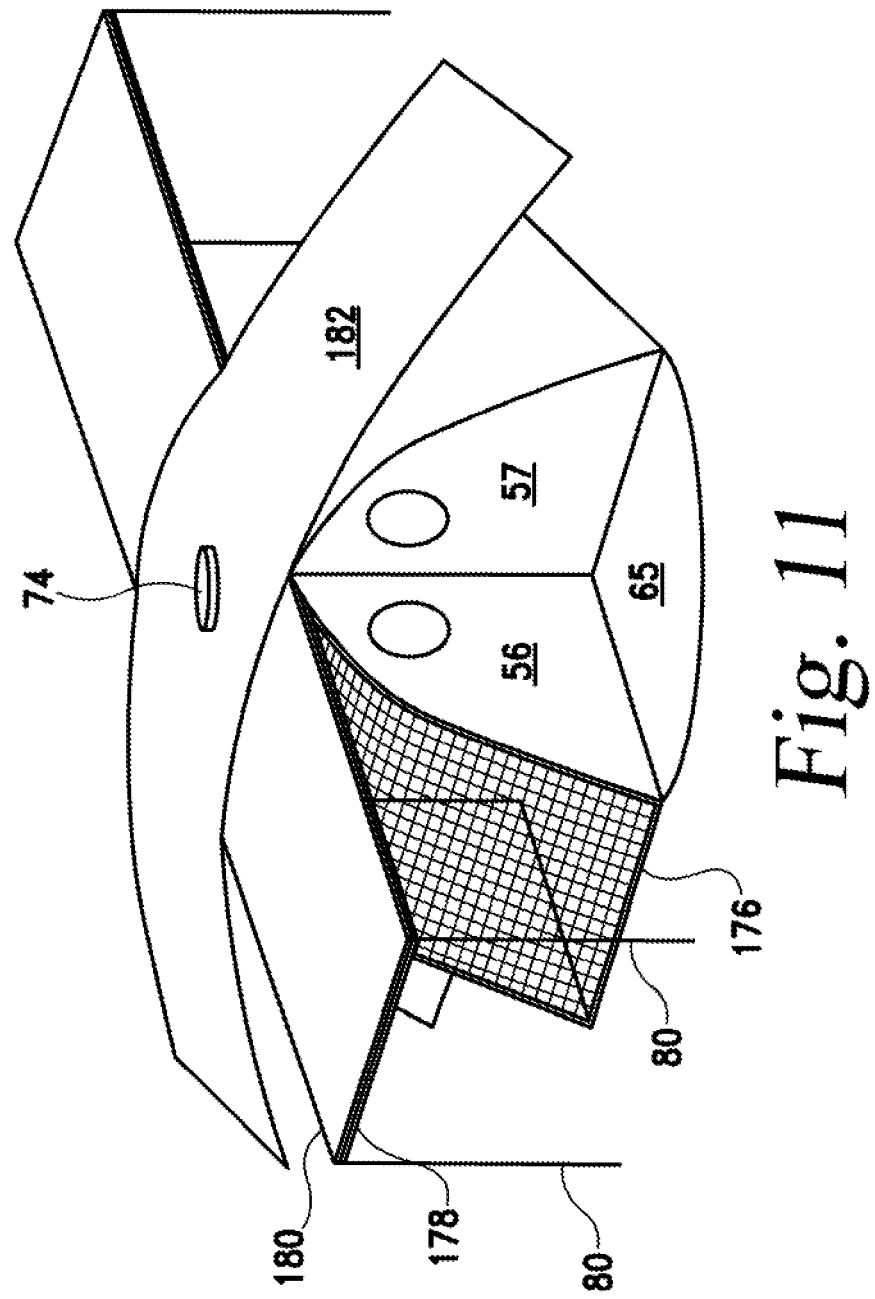
FIG. 11 is a perspective view of the camper trailer of FIG. 1 in the expanded configuration with an alternative roof structure.

In another particular example, shown in FIG. 11, the roof structure may include four roof panels 176, 178, 180, 182 where the three roof panels 176, 178, 180 are stationary and the roof panel 182 is rotatable to cover the expanded portion of the camper trailer 10 when in the expanded configuration. The three stationary roof panels 176, 178, 180 may each be made from a different material to allow for different conditions within the camper trailer 10. As an example, stationary roof panel 176 may be a screen or mesh panel that allows for airflow and ventilation into the interior space 38. Stationary roof panel 178 may be made from a clear material such as a clear polycarbonate to allow for an exterior view from the interior space 38 of the camper trailer 10. Stationary roof panel 180 may be made from an opaque material such as aluminum. The rotatable roof panel 182 may be made from any desired suitable material, such as clear polycarbonate or aluminum.

Also shown in FIGS. 9 and 11, in some embodiments, a removable table 65 may be inserted between the base rear panel 56 and the outer rear panel 57 of the body structure 30 to create additional space for placing items. Removable tables 65 may also be inserted between each of the other pairs of adjacent panels. In some embodiments, the removable table 65 may be supported directly by the panels 56 and 57. In other embodiments, the removable table 65 may be supported by a pole or other structure that is separate from the panels 56, 57. As shown, the removable table 65 may have a quarter circle shape that is similar to the shape of the panels to allow the removable table 65 to easily be stored inside the camper trailer 10, adjacent to a corresponding panel, when the camper trailer 10 is in the folded configuration. In some embodiments, the table 65 may be stored between a respective outer panel and base panel when the camper trailer 10 is in the folded configuration. In some embodiments, the table may be hinged to either the outer panel or the base panel to allow the table to be hinged downward when the camper trailer is in the expanded configuration, so that the table is supported between the base panel and the outer panel.

In certain examples, the frame 20 of the camper trailer 10 may be sized so that the camper trailer 10 has a total length of 15 feet and the total length of the interior space 38 defined within the camper trailer 10 is 12 feet. The camper trailer 10 may also be sized so that the interior space 38 has an interior width of 4 feet and an interior height of 4 feet when in the folded configuration. However, the design of the camper trailer 10 allows the camper trailer 10 to be scaled to different sizes. In other embodiments, the length and the width may be varied to be larger or smaller as desired.

Figure 12:
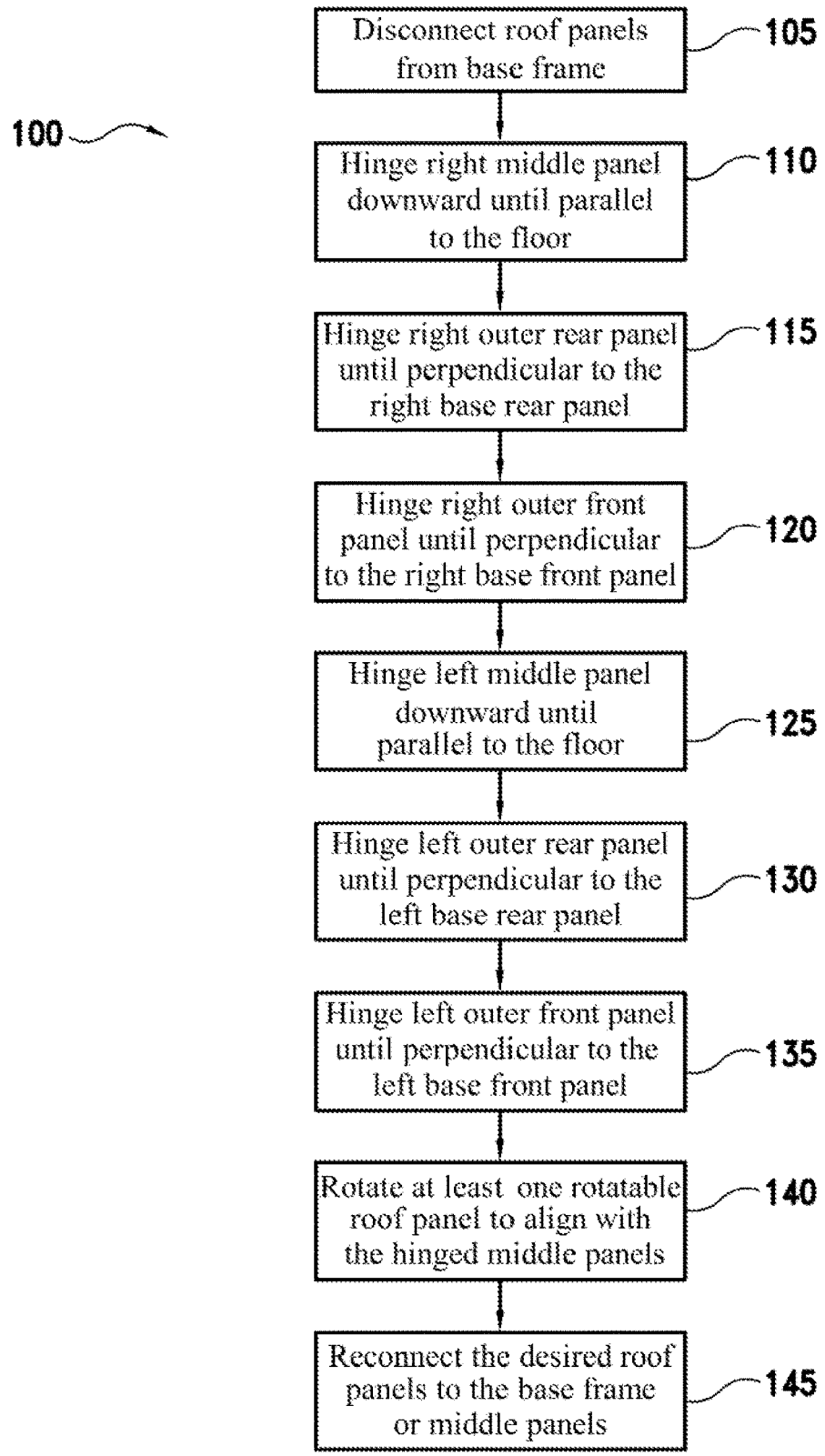
FIG. 12 is a flowchart illustrating a method of converting the expandable camper trailer from the folded configuration to the expanded configuration.

A method of converting the expandable camper trailer 10 from the folded configuration to the expanded configuration is shown in the flowchart 100 illustrated in FIG. 12. In a first stage 105, the edges of the roof panels 76, 78 are disconnected from base frame 22.

In a second stage 110, the middle panel 52 is hinged downward about its hinged connection on the floor 32 until the middle panel 52 is substantially parallel to the floor 32 of the camper trailer 10. In a third stage 115, the outer rear panel 57 is rotated about its hinged connection to the base rear panel 56 until the outer rear panel 57 is substantially perpendicular to the base rear panel 56. In this position, the outer rear panel 57 is adjacent to a side edge of the middle panel 52 and may be secured to the middle panel 52 using a pin mechanism 90 or another suitable attachment method. In a fourth stage 120, the outer front panel 55 is rotated about its hinged connection to the base front panel 54 until the outer front panel 55 is substantially perpendicular to the base front panel 54. In this position, the outer front panel 55 is adjacent to the opposite side edge of the middle panel 52 when compared to the position of the outer rear panel 57. The outer front panel 55 may be secured to the middle panel 52 using a pin mechanism 90 or another suitable attachment method.

In a fifth stage 125, the middle panel 42 is hinged downward about its hinged connection on the floor 32 until the middle panel 42 is substantially parallel to the floor 32 of the camper trailer 10. In a sixth stage 130, the outer rear panel 47 is rotated about its hinged connection to the base rear panel 46 until the outer rear panel 47 is substantially perpendicular to the base rear panel 46. In this position, the outer rear panel 47 is adjacent to a side edge of the middle panel 42 and may be secured to the middle panel 42 using a pin mechanism 90 or another suitable attachment method. In a seventh stage 135, the outer front panel 45 is rotated about its hinged connection to the base front panel 44 until the outer front panel 45 is substantially perpendicular to the base front panel 44. In this position, the outer front panel 45 is adjacent to the opposite side edge of the middle panel 42 when compared to the position of the outer rear panel 47.

The outer front panel 45 may be secured to the middle panel 42 using a pin mechanism 90 or another suitable attachment method.

In an eighth stage 140, at least one of the rotatable roof panels 76, 78 is rotated to align with the hinged middle panels 42, 52. In some embodiments, the rotated roof panel may be left unconnected to the outer panels adjacent to the middle panels 42, 52. In this instance, supports may be used to hold up the roof panel and to form a canopy. In other embodiments, the rotated roof panel may be latched to the middle panels 42, 52 to cover the expanded portion of the camper trailer 10.

In a ninth stage 145, the one or more of the roof panels 76, 78 may be reconnected to the base frame 22 to cover the panels 44, 46, 54, 56 of the sidewall assemblies 40, 50 to enclose the interior space 38. However, in some embodiments, the roof panels may remain unconnected to base frame 22. Supports may be used to arrange the unconnected roof panel into a canopy.

It should be recognized that the steps described in the flowchart 100 may performed in a different order in different embodiments. As an example, the stages 125, 130, 135 may be performed before the stages 110, 115, 120. In this embodiment, the middle panel 42 and the outer panels 45, 47 are hinged before the middle panel 52 and outer panels 55, 57 are hinged. As another example, the eighth stage 140 may be performed before the stages 125, 130, 135 so that the roof panel or roof panels are rotated before the left sidewall assembly 40 is arranged in the expanded configuration.

Although the expanded configuration of the camper trailer 10 is useful for increasing the amount of usable space, the camper trailer 10 may also be useful in the folded configuration. The open floor plan of the camper trailer allows the camper trailer to be used to haul recreation equipment, such as, kayaks, mini-bikes, camping gear or other desired equipment in the open interior space. There is more interior space when in the expanded mode.

Figure 13:
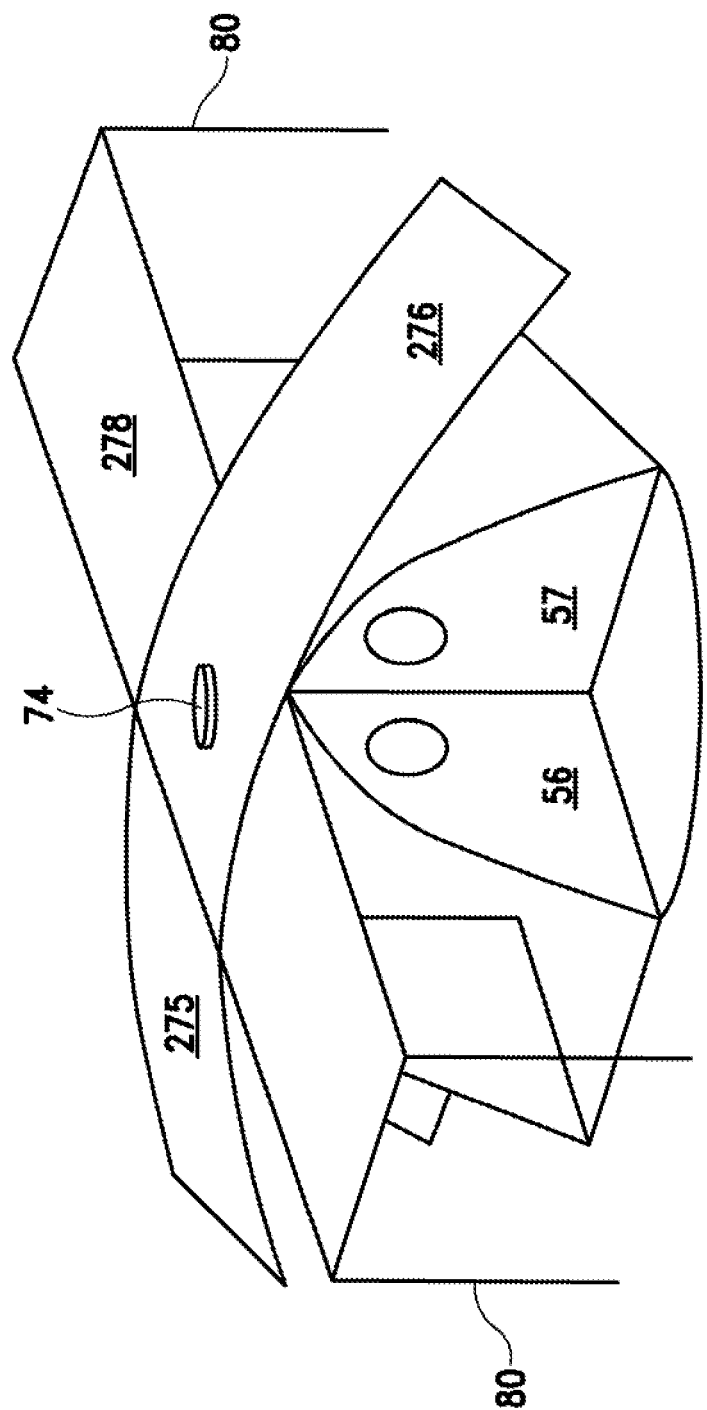
FIG. 13 is an alternative embodiment of a roof structure for the camper trailer of FIG. 1.
Figure 14:
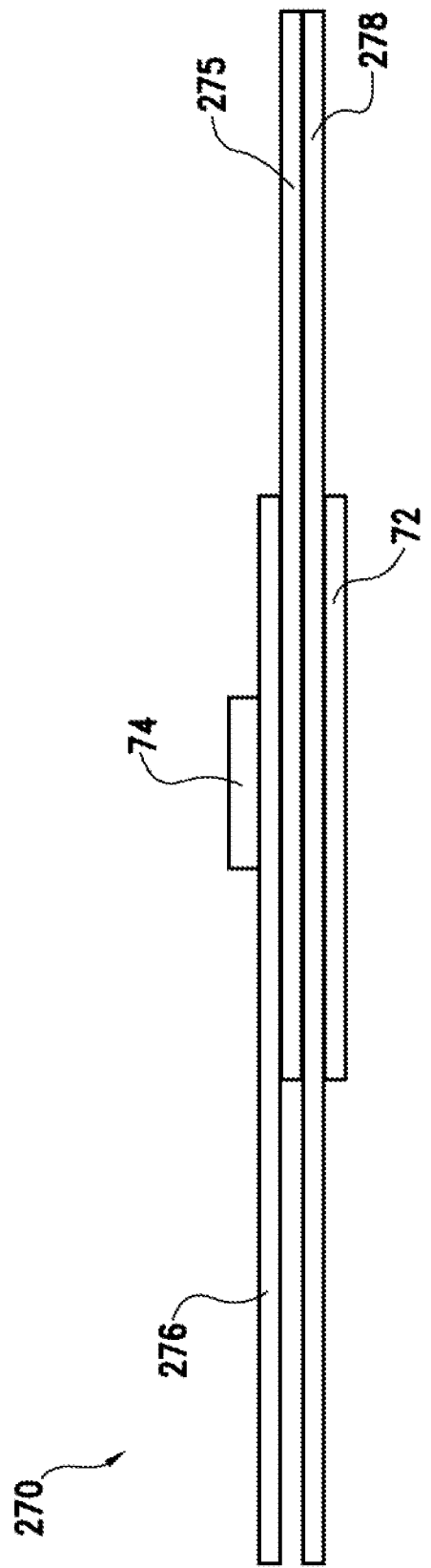
FIG. 14 is a side view of the roof structure of the camper trailer of FIG. 13.
Figure 15:
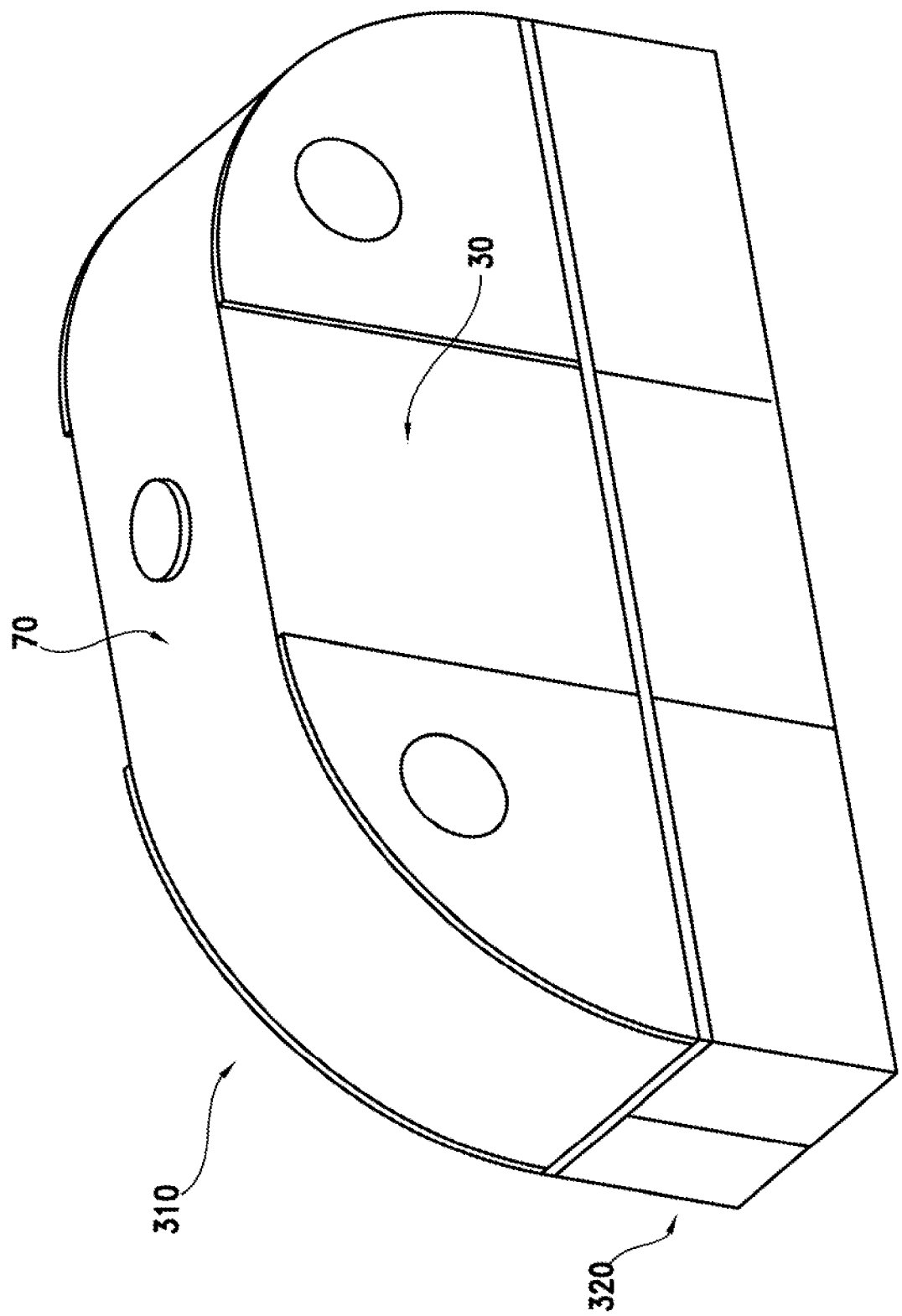
FIG. 15 is a perspective view of an alternative embodiment of an expandable camper trailer.

An alternative embodiment of the camper trailer 10 is shown in FIGS. 13-14. In this embodiment, the roof structure 270 includes the mid-roof 72 and the roof protrusion 74 extending from the mid-roof 72. A total of three roof panels 275, 276, and 278 are attached to the roof protrusion 74. In this embodiment, at least the roof panels 275, 276 are rotatable about the roof protrusion 74. The roof panel 278 may be stationary with respect to the roof protrusion 74 or the roof panel 278 may also be rotatable with respect to the roof protrusion 74. It should be realized that in other embodiments more or fewer than three roof panels may be included as desired. As an example, there could be two or three longer length panels instead of just one longer length panel 278.

The roof panel 278 has a length that is greater than the length of the roof panels 275, 276. Preferably, roof panel 278 has a length that allows the roof panel 278 to cover a length of the camper trailer 10. The roof panels 275, 276 are shorter than roof panel 278 and are used to cover one set of the outer panels 45, 47, 55, 57 when the camper trailer 10 is in the expanded configuration. The shorter length of the roof panels 275, 276 may make these roof panels easier for a single person to rotate when the camper trailer 10 is arranged in the expanded configuration.

As an example, roof panel 275 may be rotated to cover the outer panels 45, 47 extending from the left sidewall assembly 40 and the roof panel 276 may be rotated to cover the outer panels 55, 57 extending form the right sidewall assembly 50. In this example, roof panel 278 is not rotated and is used to cover the interior space 38 defined between the base panels 44, 46, 54, 56. In other embodiments, roof panel 275 is rotated to cover the outer panels 55, 57 extending from the right sidewall assembly 50 and the roof panel 276 is rotated to cover the outer panels 45, 47 extending form the left sidewall assembly 40.

Figure 16:
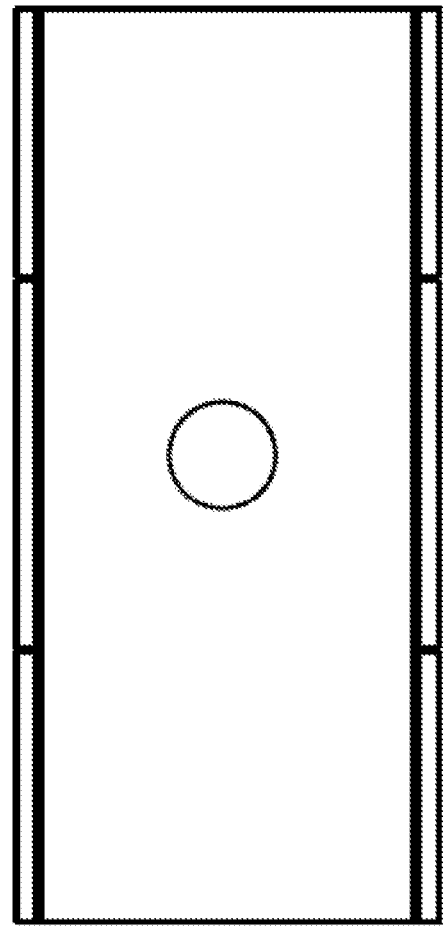
FIG. 16 is a top view of the camper trailer of FIG. 15 in the folded configuration.
Figure 17:
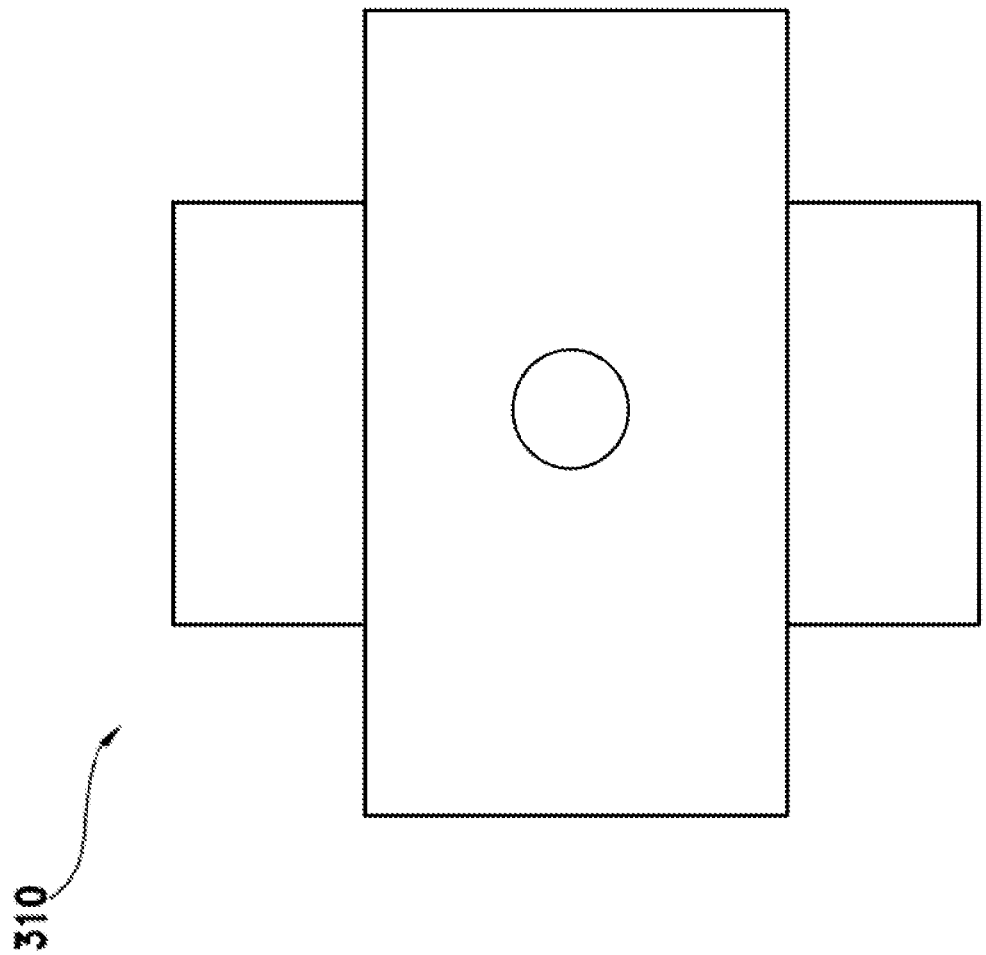
FIG. 17 is a top view of the camper trailer of FIG. 15 in the expanded configuration.

An alternative embodiment of a camper trailer 310 is shown in FIGS. 15-22. An upper portion of camper trailer 310 is similar to the camper trailer 10 and includes the body structure 30 and the roof structure 70 that is shown for camper trailer 10. Camper trailer 310 includes a base frame 320 that supports the body structure 30 and the midframe 24 of the camper trailer 310. The base frame 320 in this embodiment defines a base volume 325 within the base frame 320 that includes a kitchen module 340 and a bathroom module 360. A top view of the camper trailer 310 in the folded configuration and in the expanded configuration are shown in FIG. 16 and FIG. 17, respectively.

In some embodiments a wheel and axle assembly may be attached directly underneath the base frame 320 to allow the camper trailer 310 to be towed. In other embodiments, the base frame 320 of the camper trailer 310 may be supported by a separate frame, such as a flatbed type trailer that includes a wheel and axle for towing. In this case, the flatbed type trailer can be used to haul other cargo, such as a lawn mower or motorcycle when the camper trailer 310 is not installed on the trailer. In still other embodiments, the camper trailer 310 may not include any wheels and may act as a stationary shelter.

Figure 18:
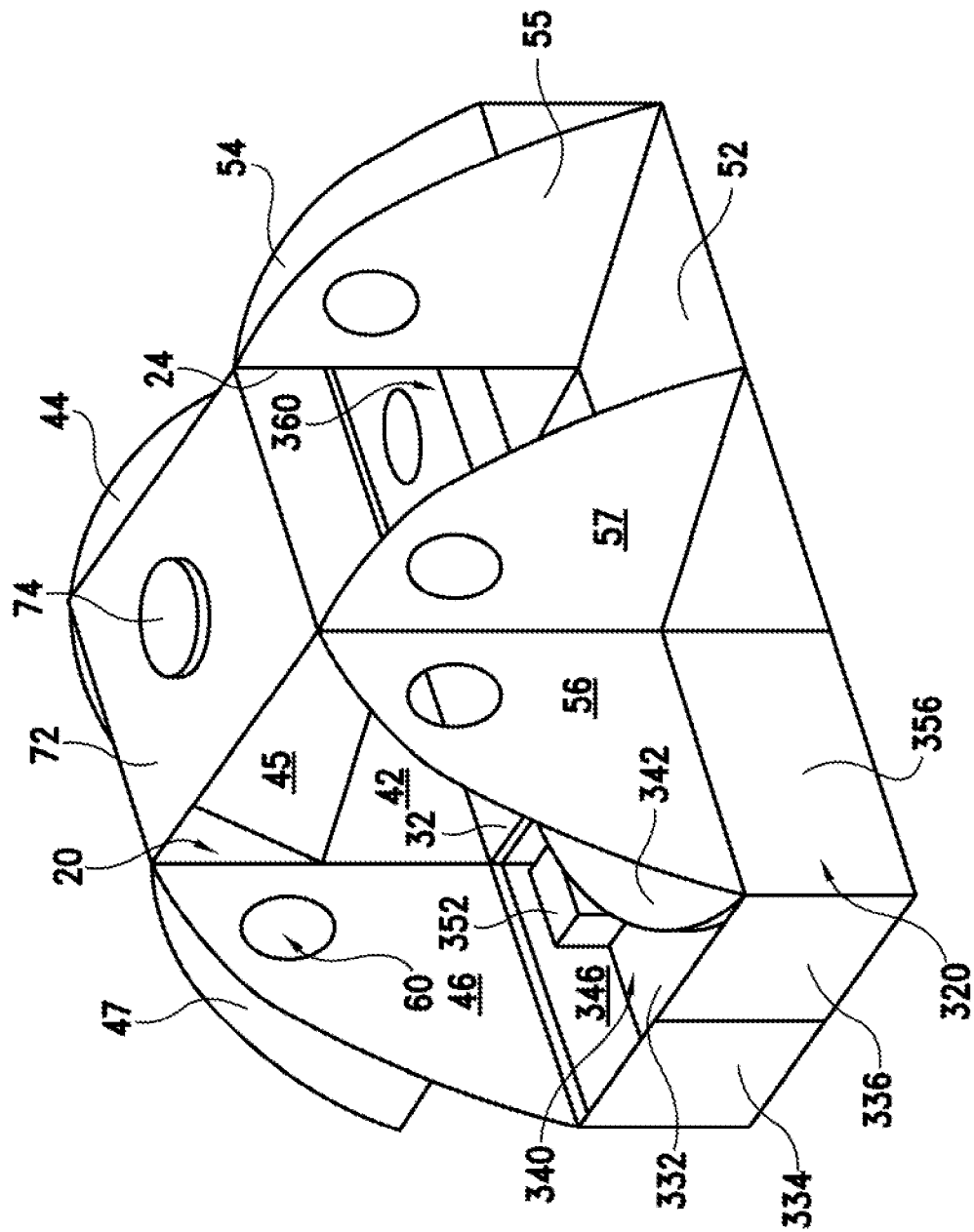
FIG. 18 is a perspective view of the camper trailer of FIG. 15 in an expanded configuration.
Figure 19:
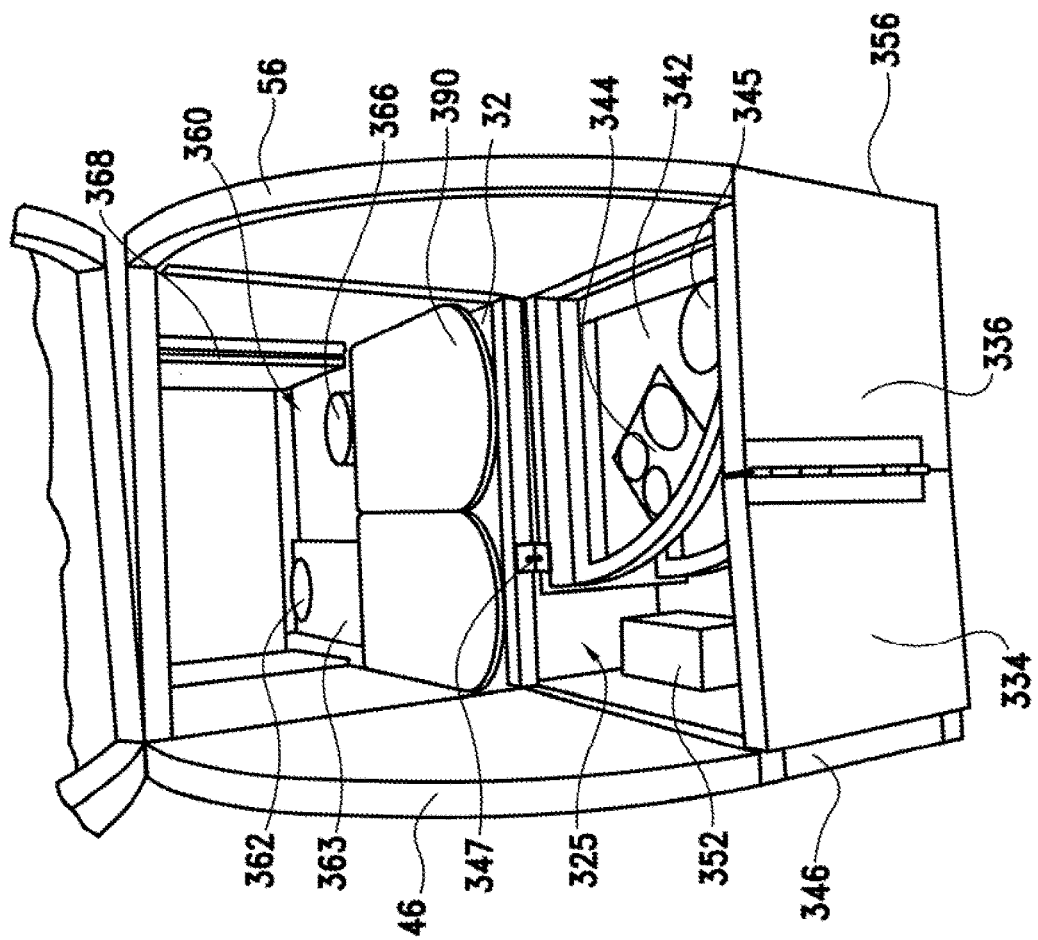
FIG. 19 is a rear view of the interior of the camper trailer of FIG. 15.

As shown in FIG. 18, the panels of the left sidewall assembly and the panels of the right sidewall assembly may be hinged with respect to each other as already described above so that the camper trailer 310 is arranged in an expanded configuration. The floor 32 of the body structure 30 is limited to the area within the midframe 24. The floor 32 does not extend to the areas adjacent to the midframe 24. Instead, these areas adjacent to the midframe 24 remain open, allowing a person to stand up within the camper trailer 310.

The kitchen module 340 is defined in an area of the base frame 320 that is adjacent to the midframe 24. In the embodiment shown, the kitchen module 340 is rearward of the midframe 24 and is bounded by a floor 332 of the base frame 320; base sidewalls 346, 356; and base partial walls 334, 336. The base sidewall 346 is connected to the base rear panel 46 and the base sidewall 356 is connected to base rear panel 56. The base partial walls 334, 336 are hingeable with respect to the base sidewalls 346, 356 to allow a walk-in access to the camper trailer 310.

A rotatable cabinet 342 is positioned within the kitchen module 340. In the embodiment shown, the rotatable cabinet 342 includes a tabletop stove 344 and a sink 345. A cooler 352 is positioned on the floor 332 of the kitchen module 340.

The floor 32 of the camper trailer 10 is raised above the floor 332 of the base frame 320. The floor 32 may serve as an elevated sleeping area that includes space for mattresses 390 or other suitable sleeping arrangements, such as sleeping pads or sleeping bags. The amount of space available for the mattresses 390 or other sleeping accessories may be increased by expanding the camper trailer 310 into the expanded configuration. The area of the base frame 320 beneath the midframe 24 may be used as an additional storage area.

A bathroom module 360 is defined in the area of the base frame 320 adjacent to the midframe 24 that is opposite of the kitchen module 340. In the embodiment shown, the bathroom module 360 is forward of the midframe 24. The bathroom module 360 is defined between the base front panel 44 and the base front panel 54. In the embodiment shown, the bathroom module 360 includes a sink 362, a toilet 366, and a shower 368. The sink 362 may include a counter 363. The shower 368 may extend up the base front panel 54, or in some embodiments, may extend up the base front panel 44.

It should be recognized that although in the embodiment shown, the kitchen module 340 is positioned in the rear of the base frame 320 of camper trailer 310 and the bathroom module 360 is positioned in the front of the of the base frame 320 of camper trailer 310, in other embodiments, the position of the kitchen module 340 and the bathroom module 360 may be switched. For example, the kitchen module 340 may be located in the front of the base frame 320 of camper trailer 310 and the bathroom module 360 may be located in the rear of the base frame 320 of camper trailer 310.

Figure 20:
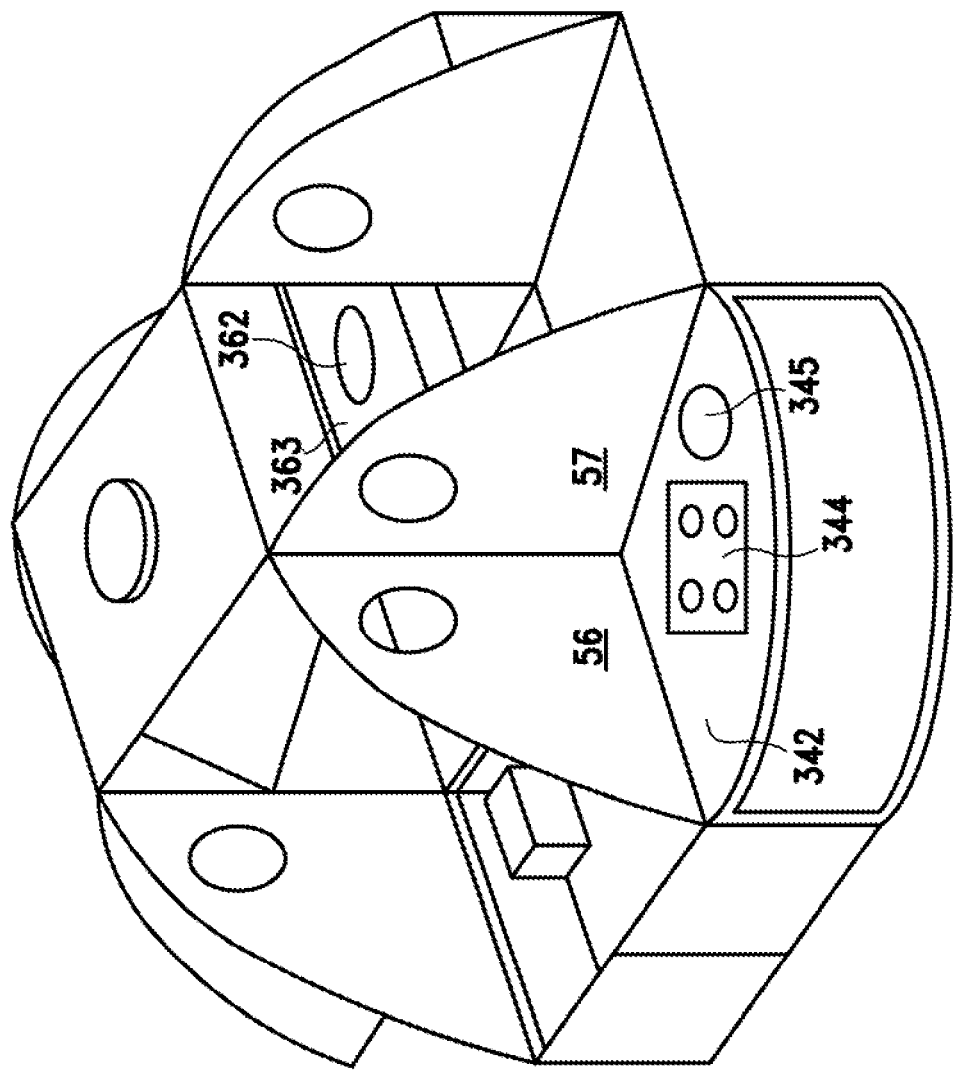
FIG. 20 is a perspective view of the body structure of the camper trailer of FIG. 15 in the expanded configuration with the rotatable cabinet rotated into the expanded configuration.

As illustrated in FIG. 20, the rotatable cabinet 342 may be hinged about the base rear panel 56, so that the rotatable cabinet 342 is positioned exterior to the camper trailer 310. In the embodiment shown, the rotatable cabinet 342 is hinged so that the rotatable cabinet 342 is positioned between the base rear panel 56 and the outer rear panel 57 when the camper trailer 310 is in the expanded configuration. In other embodiment, the rotatable cabinet 342 may be positioned in an alternative location within the camper trailer 310. For example, the rotatable cabinet 342 may be adjacent to and hinge with respect to the base rear panel 46 so that the rotatable cabinet 342 is positioned between the base rear panel 46 and the outer rear panel 47 when in the expanded configuration.

In some examples, the outer rear panel 57 may include a latch, clip, or any other suitable mechanism for securing the rotatable cabinet 342 between the base rear panel 56 and the outer rear panel 57. As shown FIG. 19, when the camper trailer 310 is in the folded configuration, the rotatable cabinet 342 may be secured to the floor 32 by a pin and latch mechanism 347 that prevents rotation of the rotatable cabinet 342. In other embodiments, other suitable mechanisms for securing the rotatable cabinet 342 within the kitchen module 340 may be used.

Figure 21:
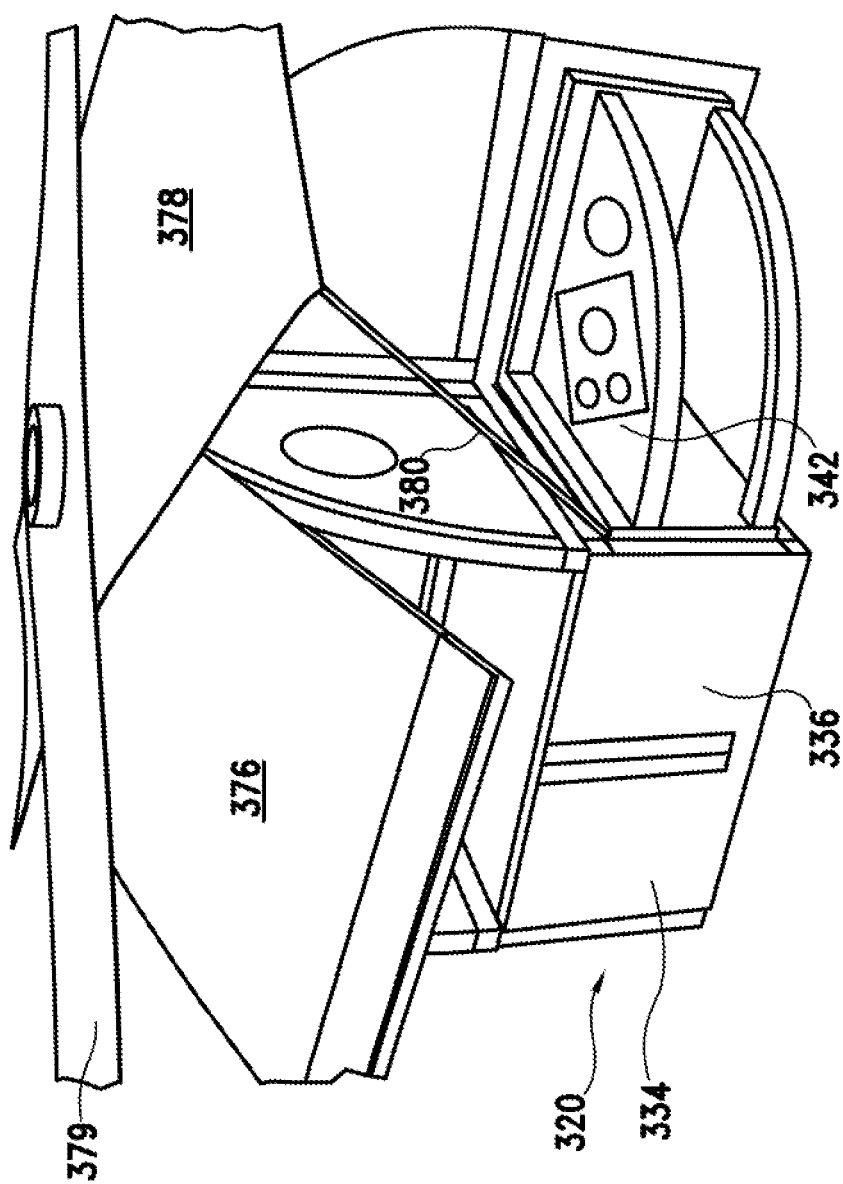
FIG. 21 is a rear perspective view of the camper trailer of FIG. 15 with roof panels rotated.
Figure 22:
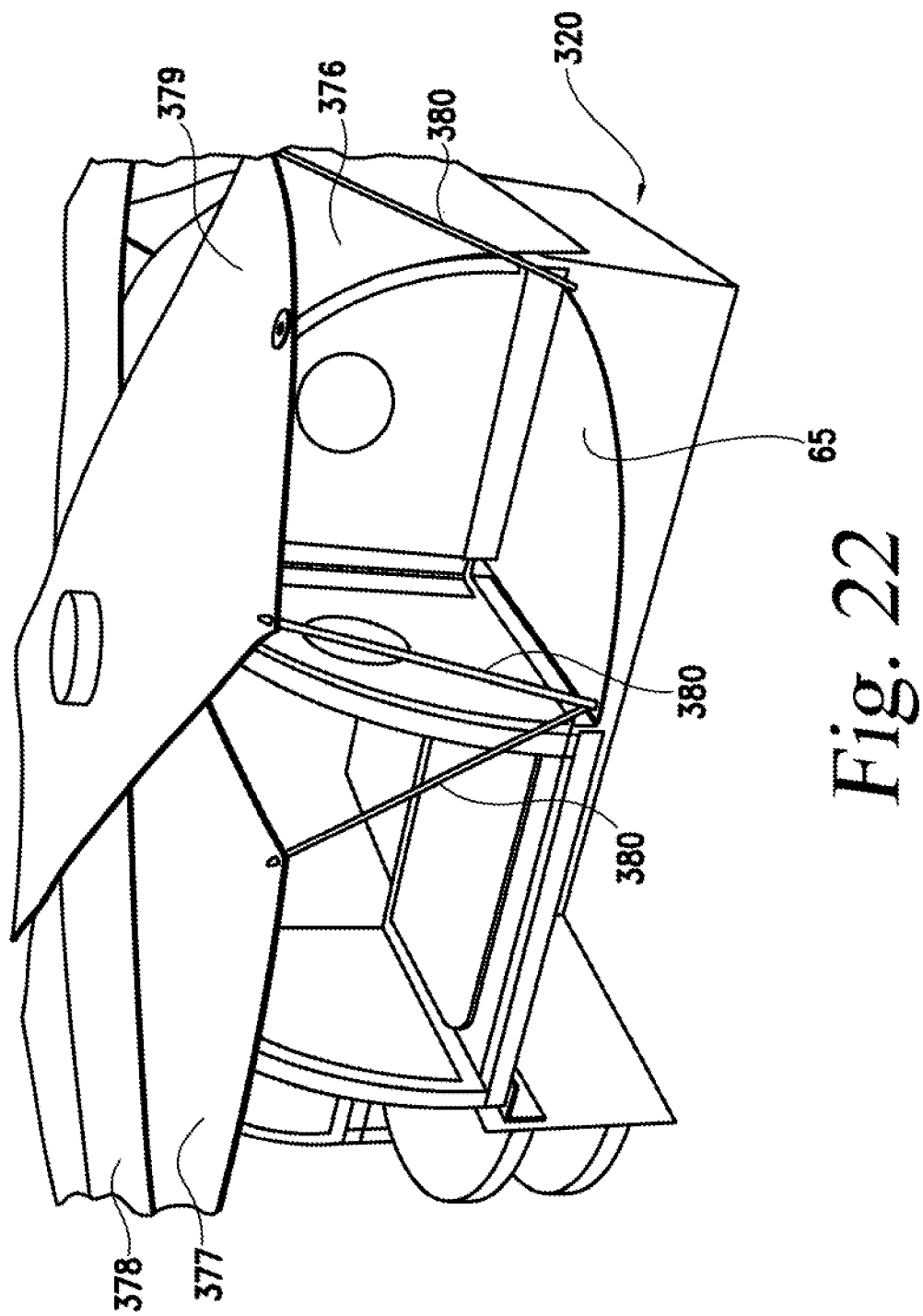
FIG. 22 is a side perspective view of the camper trailer of FIG. 15 with roof panels rotated.

As shown in FIGS. 21-22, the rotatable cabinet 342 may provide a connection point for roof supports 380 that hold up a roof panel to provide shade for the rotatable cabinet 342 when the rotatable cabinet 342 is in the expanded configuration and exterior to the camper trailer 310. In the embodiment shown, the camper trailer 310 includes a total of four roof panels 376, 377, 378, 379. As an example, in the expanded configuration, the roof panel 376 may be used to cover the base sidewalls and the roof panel 377 may be used to cover the hinged, outer sidewalls and the lowered middle panels. The roof panels 378, 379 may be arranged at an oblique angle with respect to the roof panels 376, 377 and provide additional shade adjacent to the camper trailer 310. The roof panels 378, 379 may be supported by roof supports 380 that connect to a respective roof panel 378, 379 and that extend to and connect to either the rotatable cabinet 342 or to one of the tables 65 that is positioned between the panels of the frame.

FIG. 23 shows a rain catch 410 that may be included on one or more of the roof panels described in any of the embodiments discussed above. The rain catch 410 includes a bracket 412 that extends along the width of the roof panel 76 near the edge of the roof panel 76. The bracket 412 projects outward from the roof panel 76 to collect a liquid, such as rainwater, that falls onto the roof panel 76. The rain catch 410 may optionally include rain tubes 414 that extends from the bracket 412 to direct rain water to a desired location. In some instances, the rain water collected by the bracket 412 may flow into the rain tubes 414 to be removed from the roof panel 76. In some embodiments, the rain water may be collected in a storage tank positioned underneath the rain tubes 414 either exterior to the camper trailer or within the interior of the camper trailer. The rain catch 410 provides an efficient means of water removal to prevent the ground around the camper trailer 10 from getting too wet, and the rain water may be collected and used for other desired purposes.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. An expandable trailer comprising:
   a frame including a midframe extending vertically from a base frame;
   a body structure including a floor and two sidewall assemblies extending parallel to each other from opposing edges of the floor, wherein each sidewall assembly comprises:
   a middle panel hingeable about the floor;
   a base front panel attached to the midframe and an outer front panel attached to the base front panel, wherein the outer front panel is pivotable with respect to the base front panel; and
   a base rear panel attached to the midframe and an outer rear panel attached to the base rear panel, wherein the outer rear panel is pivotable with respect to the base rear panel;
   wherein in a folded configuration, the middle panel of each sidewall is substantially perpendicular to the floor, the outer front panel of each sidewall is substantially parallel to the corresponding base front panel, and the outer rear panel of each sidewall is substantially parallel to the corresponding base rear panel; and
   wherein in an expanded configuration the middle panel of each sidewall is hinged about the floor so that the middle panel is substantially parallel to the floor, the outer front panel of each sidewall is pivoted with respect to the corresponding base front panel so that the outer front panel is substantially perpendicular to the base front panel, and the outer rear panel of each sidewall is pivoted with respect to the corresponding base rear panel so that the outer rear panel is substantially perpendicular to the base rear panel.

2. The expandable trailer of claim 1, further comprising:
   a roof structure attached to the midframe; wherein said roof structure comprises:
   a mid-roof;
   a roof protrusion extending from the mid-roof; and
   a first roof panel and a second roof panel mounted on the roof protrusion; and
   wherein at least one of the first roof panel and the second roof panel is rotatable with respect to the roof protrusion.

3. The expandable trailer of claim 2, further comprising:
a bracket that extends along a width of the first roof panel, and wherein the bracket projects outward from the first roof panel;
a tube attached to and in fluid communication with the bracket;
wherein the bracket is configured to collect liquid that runs off of the first roof panel and remove the liquid from the first roof panel through the tube.

4. The expandable trailer of claim 1, wherein the midframe includes a midframe top edge and a total of four midframe side edges.

5. The expandable trailer of claim 4, wherein the base front panel for each sidewall is attached to a different corresponding midframe side edge.

6. The expandable trailer of claim 5, wherein the base rear panel for each sidewall is attached to a different corresponding midframe side edge.

7. The expandable trailer of claim 1, wherein an interior space defined within the expandable trailer in the expanded configuration is shaped as a plus sign.

8. The expandable trailer of claim 1, wherein said floor is integral to the base frame.

9. The expandable trailer of claim 1, wherein the base frame defines a base volume below the body structure.

10. The expandable trailer of claim 9, further comprising:
a cabinet, wherein the cabinet is positioned within the base volume when the trailer is in the folded configuration; and
wherein the cabinet is rotatable with respect to the body structure so that said cabinet is configured to be rotated to a position exterior of the base volume when the trailer is in the expanded configuration.

11. The expandable trailer of claim 1, further comprising:
a table, wherein the table is insertable between adjacent panels of the body structure when the expandable trailer is in the expanded configuration.

12. An expandable trailer comprising:
a frame including a midframe extending vertically from a base frame;
a body structure including a floor and two sidewall assemblies extending parallel to each other from opposing edges of the floor, wherein each sidewall assembly comprises:
a middle panel hingeable about the floor;
a base front panel attached to the midframe and an outer front panel attached to the base front panel, wherein said outer front panel is pivotable between a position substantially parallel to the base front panel and a position substantially perpendicular to the base front panel; and
a base rear panel attached to the midframe and an outer rear panel attached to the base rear panel, wherein said outer rear panel is pivotable between a position substantially parallel to the base rear panel and a position substantially perpendicular to the base rear panel;
a mid-roof supported on top of the midframe;
a first roof panel mounted to the mid-roof;
a second roof panel mounted to the mid-roof; and
wherein the second roof panel is rotatable with respect to the first roof panel to cover the outer front panels and the outer rear panels of the sidewall assemblies when the outer front panels are substantially perpendicular to base front panels and when the outer rear panels are substantially perpendicular to the base rear panels.

13. The expandable trailer of claim 12, further comprising:
a third roof panel mounted to the mid-roof, wherein the third roof panel is rotatable with respect to the first roof panel and with respect to the second roof panel.

14. The expandable trailer of claim 13, wherein the third roof panel is made from a transparent polycarbonate material.

15. The expandable trailer of claim 12, further comprising:
at least one roof support, wherein said roof support is attachable to the first roof panel; and
wherein the roof support extends between the first roof panel and a support surface to form a canopy.

16. The expandable trailer of claim 12, wherein the base frame defines a base volume below the body structure.

17. The expandable trailer of claim 16, further comprising:
a cabinet, wherein the cabinet is positioned within the base volume when the expandable trailer is in a folded configuration; and
wherein the cabinet is rotatable with respect to the body structure so that said cabinet is configured to be rotated to a position exterior of the base volume when the trailer is in an expanded configuration.

18. A method of expanding a camper trailer comprising:
hinging a first middle panel about a floor so that the first middle panel is substantially parallel to the floor;
rotating a first outer rear panel about a hinged connection to a first base rear panel so that the first outer rear panel is substantially perpendicular to the first base rear panel;
rotating a first outer front panel about a hinged connection to a first base front panel so that the first outer front panel is substantially perpendicular to the first base front panel;
hinging a second middle panel about the floor so that the second middle panel is substantially parallel to the floor;
rotating a second outer rear panel about a hinged connection to a second base rear panel so that the second outer rear panel is substantially perpendicular to the second base rear panel;
rotating a second outer front panel about a hinged connection to a second base front panel so that the second outer front panel is substantially perpendicular to the second base front panel; and
rotating a second roof panel mounted on a mid-roof attached to a midframe extending from the floor with respect to a first roof panel attached to the mid-roof, so that the second roof panel is aligned with the first and second middle panels and covers the first and second outer rear panels and the first and second outer front panels.

19. The method of claim 18, wherein the first outer rear panel is rotated to a position adjacent to the first middle panel, and wherein the first outer front panel is rotated to a position adjacent to the first middle panel.

20. The method of claim 19, wherein the second outer rear panel is rotated to a position adjacent to the second middle panel, and wherein the second outer front panel is rotated to a position adjacent to the second middle panel.

* * * * *